US012660824B2

(12) United States Patent
Reller et al.

(10) Patent No.: US 12,660,824 B2
(45) Date of Patent: Jun. 23, 2026

(54) ACCELERATED PLANT GROWTH REGULATING AND IMPROVED FUNGICIDE COMPOSITIONS AND METHODS

(71) Applicant: Rainbow Tree Company, Minnetonka, MN (US)

(72) Inventors: Emily Reller, Eden Prairie, MN (US); Sam Drahn, St. Paul, MN (US); David Anderson, Champlin, MN (US)

(73) Assignee: Rainbow Tree Company, Minnetonka, MN (US)

( * ) Notice: Subject to any disclaimer, the term of this patent is extended or adjusted under 35 U.S.C. 154(b) by 725 days.

(21) Appl. No.: 17/316,287

(22) Filed: May 10, 2021

(65) Prior Publication Data

US 2021/0259249 A1     Aug. 26, 2021

Related U.S. Application Data

(63) Continuation-in-part of application No. 15/498,658, filed on Apr. 27, 2017, now abandoned.

(60) Provisional application No. 62/328,261, filed on Apr. 27, 2016.

(51) Int. Cl.
| | |
|---|---|
| *A01N 37/02* | (2006.01) |
| *A01N 25/02* | (2006.01) |
| *A01N 25/04* | (2006.01) |
| *A01N 43/707* | (2006.01) |
| *A01N 57/20* | (2006.01) |

(52) U.S. Cl.
CPC ........... *A01N 43/707* (2013.01); *A01N 25/02* (2013.01); *A01N 25/04* (2013.01); *A01N 37/02* (2013.01); *A01N 57/20* (2013.01)

(58) Field of Classification Search
CPC ...... A01N 37/02; A01N 25/02; A01N 43/707; A01N 25/04; A01N 57/20
See application file for complete search history.

(56) References Cited

U.S. PATENT DOCUMENTS

| | | | |
|---|---|---|---|
| 5,874,025 A | 2/1999 | Heuer | |
| 2003/0118614 A1 | 6/2003 | Sieverding | |
| 2010/0016158 A1* | 1/2010 | Kilian | A01N 43/68 |
| | | | 504/133 |

FOREIGN PATENT DOCUMENTS

| | | | | |
|---|---|---|---|---|
| NZ | 538253 A | * | 11/2006 | ............. A01N 33/12 |
| WO | WO-9403063 A1 | * | 2/1994 | ............... A01G 7/06 |

* cited by examiner

*Primary Examiner* — Bethany P Barham
*Assistant Examiner* — Danielle Johnson
(74) *Attorney, Agent, or Firm* — Merchant & Gould, P.C.

(57) ABSTRACT

The present disclosure relates to compositions and methods of regulating growth of a live plant to slow the growth of the live plant. In one embodiment, the composition consists essentially of a first component comprising a gibberellin inhibiting plant growth regulating agent and a second component comprising at least one of a short-chained monocarboxylic acid having from five to eight carbon atoms, a derivative thereof, a salt thereof, and a mixture thereof. The second component increases the efficacy of the first component such that a plant treated with the composition has slower growth than a plant treated only with the first component. In some embodiments, the second component is hexanoic acid, and the first component is paclobutrazol.

20 Claims, 1 Drawing Sheet

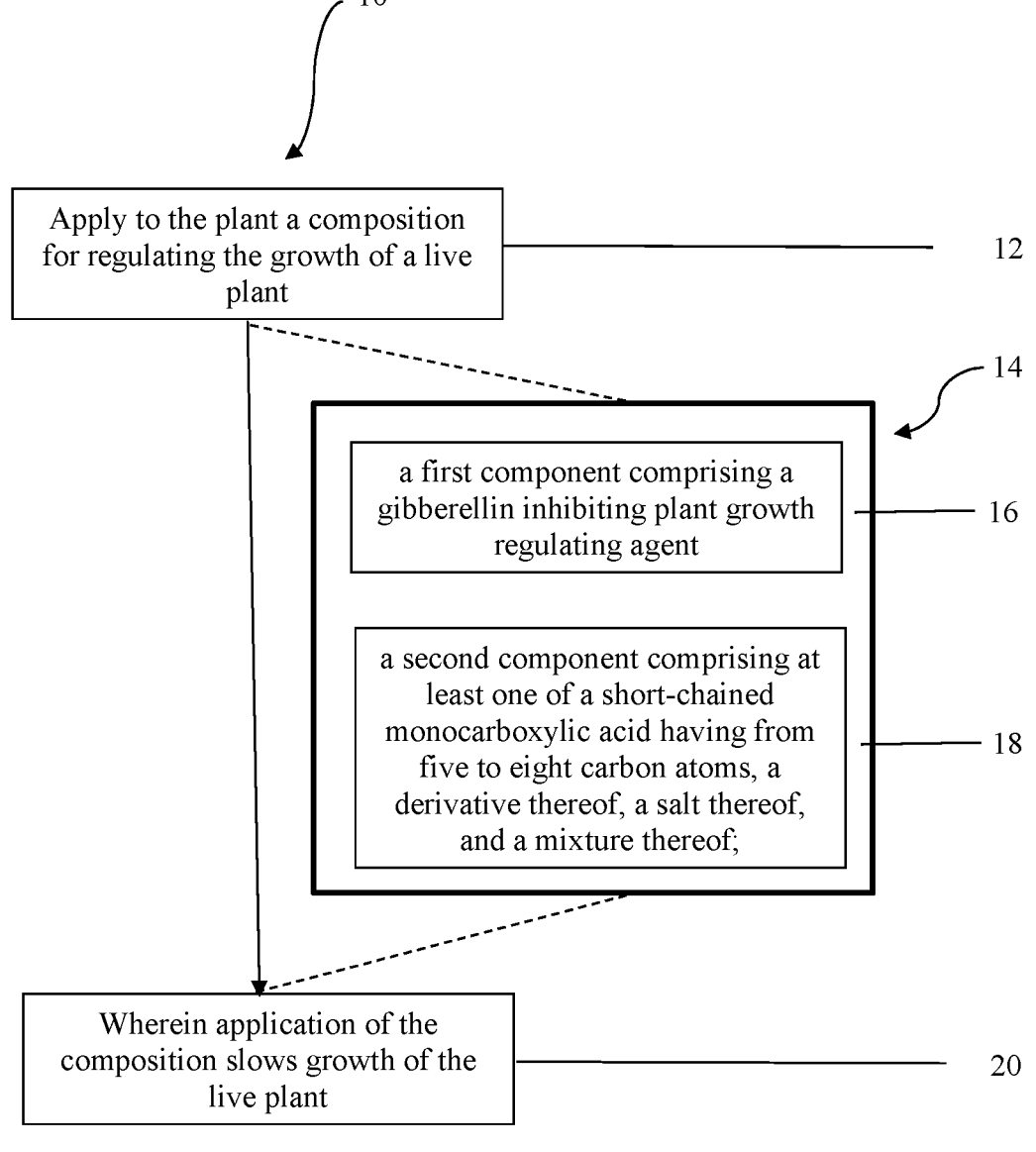

10

Apply to the plant a composition for regulating the growth of a live plant — 12

14 a first component comprising a gibberellin inhibiting plant growth regulating agent — 16 a second component comprising at least one of a short-chained monocarboxylic acid having from five to eight carbon atoms, a derivative thereof, a salt thereof, and a mixture thereof; — 18

Wherein application of the composition slows growth of the live plant — 20

ACCELERATED PLANT GROWTH REGULATING AND IMPROVED FUNGICIDE COMPOSITIONS AND METHODS

CROSS-REFERENCE TO RELATED APPLICATIONS

This application claims the benefit of U.S. patent application Ser. No. 15/498,658, titled Accelerated Plant Growth Regulating and Improved Fungicide Compositions and Methods, filed on April 27,2017, which in turn claims the benefit of U.S. Provisional Patent Application No. 62/328, 261, titled Accelerated Plant Growth Regulating and Improved Fungicide Compositions and Methods, filed Apr. 27, 2016, the contents of which are hereby incorporated by reference herein in their entirety.

FIELD OF THE INVENTION

The present disclosure relates to plant growth regulating compositions, plant fungicide compositions, and the use thereof. Particularly, the present disclosure relates to compositions and methods for accelerated plant growth regulation, without killing the plant, using a gibberellin inhibiting plant growth regulator. More particularly, the present disclosure relates to plant growth regulating compositions and fungicide compositions comprising a gibberellin inhibiting plant growth regulator and a short-chain monocarboxylic acid or a salt or amine thereof.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There are situations in which it may be desirable or useful to slow the growth of, but not kill, a plant such as a tree, bush, shrub, grass, annual, perennial, or groundcover. For example, if a plant becomes too large, it may interfere with the foundation or use of existing structures, landscaping, lines of sight, or other nearby objects. As a particular example, a tree's growth may interfere with nearby power-lines. Additionally, as plants grow larger, they may require additional water, nutrients, and other resources. If the available resources are limited, a plant may suffer as it increases in size. In such situation, it may be desirable to slow the growth of the plant instead of killing or removing the plant.

It may also be desirable to slow a plant's growth in an effort to reduce the amount of trimming or other mainte- nance the plant requires. Reduced maintenance may lead to reduced labor, plant waste, and disposal costs. Additionally, in some situations, reduced maintenance may limit the amount of time that a maintenance crew interferes with road or pedestrian traffic, for example, and may lead to reduced potential injuries. Moreover, reduced maintenance may lead to improved plant quality. Plant growth may also be con-trolled in greenhouse and nursery settings, where the devel-opment of a crop may be slowed in order to produce compact and uniform plants with more consistent quality. It is to be appreciated that, in such situation, it is not desirable to kill the plant or crop. Regulation of flowering and fruit production may also be done. Turfgrass or other grasses or groundcovers may be controlled in order to reduce mowing frequency.

Further, the control of fungi on plants is important as fungal growth on plants can inhibit the production of foliage, fruit, seeds, and/or roots. Fungal diseases can affect the overall quality of a plant as well. Fungicides may be beneficial to plants by slowing, mitigating, or prohibiting the growth of fungi or by killing the fungi without substantially harming the treated plant itself. Fungicides are typically used on a variety of plant types as both preventative and curative measures.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a method for treating a plant. The method may include applying to the plant a first component having a gibberellin inhibiting plant growth regulator or regulating agent, and applying to the plant a second component having at least one of a short-chained monocarboxylic acid having from five to eight carbon atoms, a derivative thereof, a salt thereof, and an aqueous mixture thereof. The short-chained monocarboxylic acid operates to enhance the efficacy of the plant growth regulator. In some embodiments, the short-chained monocarboxylic acid may be hexanoic acid. In some embodiments, the plant growth regulating agent may be selected from the group consisting of trinexapac-ethyl, prohexadione-calcium, paclobutrazol, dikegulac-sodium, uniconazole, flurprimidol, mepiquat-chloride, chlormequat-chloride, butralin, daminozide, ethephon, maleic hydrazide, and a mixture thereof. Particularly, the plant growth regu-lating agent may include at least one of paclobutrazol and flurprimidol. In some embodiments, the plant growth regu-lating agent may include a combination of paclobutrazol and prohexadione-calcium. In some embodiments, the plant growth regulating agent may include a combination of paclobutrazol and ethephon. The first and second compo-nents may be applied to the plant consecutively in some embodiments. Alternatively, the first and second compo-nents may be applied simultaneously as a mixture in other embodiments. The first and second components may be applied to at least one of the plant roots, stems, trunk, branches, and foliage of the plant. The first and second components may be applied through irrigation, may be applied using a drench application, may be applied by spraying, may be applied using a soil injection application, or may be applied using a trunk or stem injection application in some embodiments.

The present disclosure, in one or more embodiments, additionally relates to a composition for treating a plant. In one embodiment, the composition consists essentially of an effective amount of a gibberellin inhibiting plant growth regulating agent and an effective amount of a hexanoic acid composition for increasing the efficacy of the plant growth regulating agent. The language "consisting essentially of" and "consist essentially of" is used herein to exclude active or inactive ingredients that materially change the basic and novel characteristics of the claimed composition. A plant growth regulating composition of the present disclosure slows the growth of a live plant but does not kill the plant. Herbicides, and more specifically broadleaf herbicides, are intended to kill plants to which they are applied, would materially change the basic and novel characteristics of the claimed composition, and are excluded from plant growth regulating compositions as disclosed herein.

A plant growth regulating composition as disclosed herein is particularly useful for application to broadleaf plants such as shrubs. Accordingly, the plant growth regulating composition comprises a gibberellin inhibitor plant growth regulator and excludes broadleaf herbicides.

The present disclosure, in one or more embodiments, additionally relates to another composition for treating a plant. The composition may include first means for regulating the growth of a plant and second means for improving the effectiveness of the first means. In some embodiments, the second means for improving the effectiveness of the first means may include a hexanoic acid composition. In some embodiments, the hexanoic acid composition may include hexanoic acid and an emulsifier.

The present disclosure, in one or more embodiments, additionally relates to another method for treating a plant. The method may include applying to the plant a first component having a fungicide, and applying to the plant a second component having at least one of a short-chained monocarboxylic acid having from five to eight carbon atoms, a derivative thereof, a salt thereof, and an aqueous mixture thereof. In some embodiments, the short-chained monocarboxylic acid may be hexanoic acid. The fungicide may be selected from the group consisting of propiconazole, thiabendazole, thiophanate methyl, myclobutanil, azoxystrobin, chlorothalonil, tebuconazole, and a mixture thereof. In some embodiments, the first and second components may be applied using at least one of a drench application, a spray application, a soil injection application, a trunk injection application, and a stem injection application.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1 is flow chart of a method for regulating growth of a live plant, in accordance with one embodiment.

DETAILED DESCRIPTION

The present disclosure, in some embodiments, relates to plant growth regulating compositions having a gibberellin inhibiting plant growth regulator or regulating agent and a short-chain monocarboxylic acid or a salt or amine thereof. The short-chain monocarboxylic acid enhances the efficacy of the plant growth regulator. Additionally, in some embodiments, the present disclosure relates to anti-fungal compositions having a fungicide agent and a short-chain monocarboxylic acid or salt or amine thereof. The present disclosure, in some embodiments, further relates to various methods and rates of application of such compositions. Application of a plant growth regulating composition of the present disclosure may lead to accelerated plant growth regulation without killing the plant. In particular, the addition of a short-chain monocarboxylic acid or salt or amine thereof to a plant growth regulating composition may act to accelerate and/or increase effectiveness of the regulator. Likewise, application of an anti-fungal composition of the present disclosure may lead to improved disease control. In particular, the application of a short-chain monocarboxylic acid or salt or amine thereof to an anti-fungal composition may act to improve the effectiveness of the fungicide agent.

The methods and compositions provided herein are used for slowing growth of a live plant. For the avoidance of doubt, killing the plant is not a desired outcome of slowing the growth of the plant and is excluded from the definition of "slowing the growth of a plant" as used herein.

A composition of the present disclosure may have active and inactive ingredients. In some embodiments, a composition of the present disclosure may include one or more growth regulating agents as active ingredient(s). A plant growth regulating composition as disclosed herein is particularly useful for application to broadleaf plants such as shrubs. Accordingly, the plant growth regulating composition comprises a gibberellin inhibitor plant growth regulator and excludes broadleaf herbicides.

A plant growth regulating composition of the present disclosures consists essentially of a gibberellin inhibitor plant growth regulator and a chained monocarboxylic acid. While other active or inactive ingredients may be added to the composition, such active or inactive ingredients cannot materially change the basic and novel characteristics of the claimed composition. A plant growth regulating composition of the present disclosure slows the growth of a live plant but does not kill the plant. Herbicides, and more specifically broadleaf herbicides, are intended to kill plants to which they are applied, would materially change the basic and novel characteristics of the claimed composition, and are excluded from plant growth regulating compositions as disclosed herein.

In some embodiments, a composition of the present disclosure may include one or more plant growth regulators, also referred to as plant growth regulating agents. Specifically, the composition may include a plant growth regulator that inhibits gibberellin. As defined by the Unites States Environmental Protection Agency, a plant growth regulator is intended, through physiological action, to accelerate or retard growth, or alter plant behavior or the produce of the plant. Examples of plant growth regulator claims include: increased blossom set, stimulation of root or plant growth, prevention of sucker growth, delayed onset of sprouting of harvested root crops, abscission stimulation of fruit crops, stimulates plant growth and fruiting, promotes fruit and seed development, increases stem and stalk strength, and increases fruit size. See *EPA Label Review Manual*, April 2014, pp. 2-6 and 2-7. The Florida Department of Agriculture and Consumer Services defines a plant growth regulator as a substance or mixture of substances intended, through physiological action, for accelerating or retarding the rate of growth or maturation or for otherwise altering the behavior of ornamental or crop plants or the produce thereof, but not including substances intended as plant nutrients, trace elements, nutritional chemicals, plant inoculants, or soil amendments. See *Plant Growth Regulators*, pp. 101-102,

*Agronomy Department, UF/IFAS Extension*, February 2006 by Frederick M. Fishel, citing Florida Department of Agriculture and Consumer Services.

There are five groups of plant growth regulating compounds: gibberellin (GA), cytokinin, ethylene, and abscisic acid (ABA). Compositions of the present invention comprise plant growth regulators or plant growth regulating agents that inhibit gibberellin (GA) production and/or biosynthesis, also referred to as gibberellin inhibitors or gibberellin inhibiting plant growth regulators. For the purposes of this invention, other types of plant growth regulating compounds, including broadleaf herbicides, are excluded from the terms "plant growth regulating compound," "plant growth regulator," and "plant growth regulating agent."

Plant growth regulators used in compositions as disclosed herein function primarily by interfering with the production of gibberellin or gibberellic acid, a hormone, in a plant. Gibberellin or gibberellic acid is responsible for the elongation of plant cells. For example, onium-type plant growth regulators such as chlormequat-chloride and mepiquat-chloride may function by blocking the synthesis of gibberellin early in the biosynthetic pathway. Growth regulating agents comprising a nitrogen-containing heterocycle, such as flurprimidol, paclobutrazol and uniconazole-P, may act as inhibitors of monooxygenases that catalyze oxidative steps in gibberellin biosynthesis. Structural mimics of 2-oxoglutaric acid, such as the acylcyclohexanediones trinexapac-ethyl and prohexadione-calcium, may interfere with the late steps of gibberellin biosynthesis. There are various types of plant growth regulators, such as, for example: azoles (such as uniconazole, and paclobutrazol), cyclohexane carboxylates (such as trinexapac-ethyl, and prohexadione-calcium), pyrimidinyl carbinols (such as flurprimidol, and ancymidol), quarternary ammoniums (such as chlormequat-chloride, and mepiquat-chloride).

A composition as provided herein may comprise a gibberellin biosynthesis inhibitor plant growth regulating agent, such as a "class A" or "class B" gibberellin biosynthesis indicator. In some embodiments, the plant growth regulating agent or gibberellin inhibitor of the composition is a paclobutrazol, such as Technical Paclobutrazol provided by Fine Americas, Inc. Paclobutrazol may slow plant growth by interfering with gibberellin biosynthesis. As a result, paclobutrazol may reduce growth, including internodial growth, and/or reduce growth rate. In some embodiments, paclobutrazol may act to increase root growth, bring about early fruitset, and/or increase seedset in certain plants. Paclobutrazol or other gibberellin inhibiting plant growth regulators may also provide plant health benefits, and may result in a plant having improved resistance to stress or damage such as from drought, darker green leaves, higher resistance against fungi and/or bacteria, and enhanced root development.

In other embodiments, other gibberellin inhibiting plant growth regulating agent(s) may be used. For example, in some embodiments, a composition of the present disclosure may include one or more plant growth regulating agents, including but not limited to, trinexapac-ethyl, prohexadione-calcium, paclobutrazol, uniconazole, flurprimidol, mepiquat-chloride, mepiquat pentaborate, chlormequat-chloride, dikegulac-sodium, ancyimidol, butralin, daminozide, ethephon, maleic hydrazide and a mixture thereof. A combination of plant growth regulating agents may be used in some embodiments. For example, a composition of the present disclosure may include paclobutrazol and flurprimidol in some embodiments, or a combination of ingredients such as paclobutrazol and ethephon. In one embodiment, a composition of the present disclosure comprises a plant growth regulating agent comprising a combination of paclobutrazol and prohexadione-calcium.

A composition of the present disclosure may further include hexanoic acid or a monocarboxylic acid with similar chain structure having from five to eight carbon atoms, such as pentanoic acid, heptanoic acid, or octanoic acid, their derivatives, their salts, and/or aqueous or other mixtures thereof containing modified hexoses and/or amines. The hexanoic acid or monocarboxylic acid acts to increase the efficacy of the gibberellin inhibiting plant growth regulator. One or more amines may include, but not be limited to ammonia, 1,3-diaminopropane, furfurylamine, allantoin, putrescine, spermidine, spermine, alpha-aminoacids, and a mixture thereof. A salt of a monocarboxylic acid may be an alkaline or an alkaline earth metal salt in some embodiments. Potassium salt(s) may be used in some embodiments. Hexanoic acid and monocarboxylic acids with similar chain structure having from five to eight carbon atoms may have particular benefits for plants. For example, hexanoic acid and similar acids may increase a plant's resistance to fungi or other stresses. It thus may be appreciated that a composition of the present disclosure may include one or more components having similar beneficial plant properties, in addition to or alternative to hexanoic acid or monocarboxylic acid with similar chain structure having from five to eight carbon atoms.

FIG. 1 illustrates a flow chart of a method for regulating growth of a live plant, without killing the plant, in accordance with one embodiment. As shown, the method 10 may comprise applying 12 to the plant a composition for regulating the growth of a live plant. The composition 14 may consist essentially of a first component 16 comprising a gibberellin inhibiting plant growth regulating agent and a second component 18 comprising at least one of a short-chained monocarboxylic acid having from five to eight carbon atoms, a derivative thereof, a salt thereof, and a mixture thereof. In accordance with the method 10, application of the composition slows growth 20 of the live plant.

In one or more embodiments, a method for regulating growth of a live plant, without killing the plant, is provided. The method includes the steps of applying to the plant a first component comprising a gibberellin inhibiting plant growth regulating agent and applying to the plant a second component comprising at least one of a short-chained monocarboxylic acid having from five to eight carbon atoms, a derivative thereof, a salt thereof, and a mixture thereof. Applying the first component and the second component, serially or in combination, causes the plants to have visibly less growth than plants treated with a gibberellin inhibiting plant growth regulating agent alone. The method thus includes applying a monocarboxylic acid having from five to eight carbon atoms, such as hexanoic acid, to improve the effectiveness of a gibberellin inhibiting plant growth regulator.

In one or more embodiments, a composition for regulating the growth of a live plant, without killing the plant, is provided. The composition consists essentially of a gibberellin inhibiting plant growth regulating agent and a short-chained monocarboxylic acid having from five to eight carbon atoms, a derivative thereof, a salt thereof, and a mixture thereof.

In the composition and the method, the monocarboxylic acid, or the hexanoic acid, improves the effectiveness of the plant growth regulating agent. More specifically, the monocarboxylic acid improves the effectiveness of the growth regulator across plant species and across varying application rates. While the effectiveness of different quantities varied across different species, the overall result—that the addition of monocarboxylic acid produces a marked increase in the effectiveness of the growth regulator, without killing the plant—is clear. The improved effectiveness is shown across different growing environments and application types in the Examples provided herein.

Not only do the claimed acids improve the effectiveness of the growth regulator, but they provide for dramatic growth reductions that lead to significant improvements in the art. With the claimed invention, farmers, growers, and others have the option to apply reduced quantities of growth regulator and/or to apply fewer applications of growth regulator, which may lead to reduced costs. Additionally the claimed invention may lead to reduced need for plant trimming and maintenance efforts. With reduced trimming and maintenance efforts there is less plant waste to dispose of, and traffic interruptions are reduced as maintenance workers do not need to trim plants near roadways as frequently. As a result, labor is reduced, the use of power equipment is reduced leading reduced injuries, less fuel consumption, and a reduction in carbon emissions.

Additionally or alternatively, a composition of the present disclosure may include one or more fungicides or anti-fungal agents. Examples of suitable fungicides may include, but are not limited to, acibenzolar-S-methyl, azoxystrobin, benalaxyl, benomyl, bitertanol, bixafen, boscalid, bromuconazole, captafol, captan, carbendazim, carpropamide, chinomethionat, chlorothalonil, chlozolinate, copper hydroxide, cyprodinil, dichlofluanid, dichlorophen, diclocymet, diclomezine, diethofencarb, difenoconazole, dimethomorph, diniconazole, dithianon, epoxiconazole, famoxadone, fenarimol, fenbuconazole, fenfuram, fenpiclonil, fentin, fluazinam, fludioxonil, fluopyram, fluoroimide, fluquinconazole, flusulfamide, flutolanil, folpet, hexaconazole, imibenconazole, ipconazole, iprodione, isopyrazam, isotianil, kresoxim-methyl, mancozeb, maneb, mepanipyrim, mepronil, metominostrobin, metconazole, metiram, myclobutanil, nuarimol, orysastrobin, oxine-copper, oxolinic acid, pencycuron, penthiopyrad, phthalide, polyoxins, probenazole, procymidone, propiconazole, propineb, pyroquilon, quinoxyfen, quintozene, tebuconazole, tecloftalam, tecnazene, thiabendazole, thifluzamide, thiophanate-methyl, thiram, tiadinil, tolclofos-methyl, tolylfluanid, triadimefon, triadimenol, triazoxide, tricyclazole, triforine, triticonazole, validamycin, vinclozolin, zineb, ziram and derivatives thereof.

In some embodiments, a broad spectrum fungicide such as azoxystrobin may be used. In some embodiments, a commercial fungicide having azoxystrobin, such as Heritage fungicide provided by Syngenta. Azoxystrobin may be effective against multiple types of fungal disease, including Ascomycota, deuteromycota, basidiomycota, and oomycota. Azoxystrobin may generally act to inhibit spore germination and mycelial growth to control fungal disease.

Inactive ingredients of a composition of the present disclosure may include, but are not limited to, one or more solvents or carrier, dispersing agents, anti-foam agents, suspension agents, thickening agents, and/or surfactants. Water or another liquid may also be used as a diluent in some embodiments.

Examples of suitable solvents or carrier liquids may include, but are not limited to, monohydric alcohols, such as methanol, ethanol, propanol, isopropanol, butanol, and tetrahydrofurfuryl alcohol; polyhydric alcohols, such as ethylene glycol, diethylene glycol, propylene glycol, hexylene glycol, polyethylene glycol, polypropylene glycol, and glycerin; polyol compounds, such as propylene glycol ether;

ketones, such as acetone, methyl ethyl ketone, methyl isobutyl ketone, diisobutyl ketone, and cyclohexanone; ethers, such as ethyl ether, dioxane, ethylene glycol monoethyl ether, dipropyl ether, and tetrahydrofuran; aliphatic hydrocarbons, such as paraffin, naphthene, isoparaffin, kerosene, and mineral oil; aromatic hydrocarbons, such as benzene, toluene, xylene, solvent naphtha, and alkyl naphthalene; halogenated hydrocarbons, such as dichloromethane, chloroform, and carbon tetrachloride; esters, such as ethyl acetate, diisopropyl phthalate, dibutyl phthalate, dioctyl phthalate, and dimethyl adipate; lactones, such as gamma-butyrolactone; amides, such as dimethylformamide, diethylformamide, dimethylacetamide, and N-alkyl pyrrolidone (N-methylpyrrolidone, etc.); nitriles, such as acetonitrile; sulfur compounds, such as dimethyl sulfoxide; vegetable oils, such as soybean oil, rapeseed oil, cotton seed oil, castor oil; and water. These and other solvents or carrier liquids may be used alone or in combination.

Examples of carrier solids may include, but are not limited to, talc, titanium dioxide, pyrophyllite clay, silica, attapulgite clay, chalk, diatomaceous earth, lime, calcium carbonate, bentonite clay, fuller's earth, fertilizer, cotton seed hulls, peanut hulls, wheat flour, soybean flour, pumice, wood flour, walnut shell flour, and lignin. These and other carrier solids may be used alone or in combination.

Examples of suitable dispersing agents may include, but are not limited to, sodium, calcium, aluminum, lingo-sulfonate, lignin sulfite waste liquors, calcium lignin sulfonate, methyl cellulose, hydroxymethyl cellulose, calcium silicate, and magnesium aluminum silicate; and/or surfactants such as nonionic, anionic, cationic, and amphoteric surfactants. Formulated dispersing agents such as Disperplast™ or Disperbyk™ may be used as well. These and other dispersing agents may be used alone or in combination.

Examples of suitable anti-foam agents may include, but are not limited to, silicones, including silicone emulsion. These and other anti-foam agents may be used alone or in combination.

Examples of suitable suspension agents may include, but are not limited to, carboxymethyl cellulose and salts thereof, dextrin, soluble starch, xanthan gum, guar gum, sucrose, polyvinyl pyrrolidone, gum Arabic, polyvinyl alcohol, polyvinyl acetate, sodium polyacrylate, polyethylene glycols, polyethylene oxides, phospholipids, cellulose powder, dextrin, modified starch, polyaminocarboxylic acid chelating compounds, cross-linked polyvinyl pyrrolidone, maleic acid-styrene copolymers, (meth)acrylic acid copolymers, half esters of polyhydric alcohol polymer and dicarboxylic anhydride, water soluble polystyrene sulfonates, paraffin, terpene, bentonite clay, polyamide resins, polyacrylates, polyoxyethylene, waxes, polyvinyl alkyl ether, alkylphenol-formaldehyde condensates, and synthetic resin emulsions. Formulated suspension agents, including carbomers such as Carbopol may be used as well. In some embodiments, Carbopol Aqua SF-1 Polymer may be used as a suspension agent. These and other suspension agents may be used alone or in combination.

One or more thickening agents may be used in addition to or in place of one or more suspension agents. Examples of thickening agents may include water soluble polymers, such as gum based thickeners, including cellulose gum, xanthan gum, guar gum, and diutan gum, polyvinyl pyrrolidone, carboxyvinyl polymers, acrylic polymers, starch derivatives, and polysaccharides. Formulated thickening agents such as Kelzan S™ may be used as well. These and other thickening agents may be used alone or in combination. One or more thickening agents may be beneficial in compositions having one or more non-water soluble ingredients. For example, a gibberellin inhibiting plant growth regulating agent such as paclobutrazol, which in some cases may be non-water soluble, may be added to the composition in a ground or powdered form. The ground or powdered paclobutrazol may tend to settle or separate out of the composition. Thus, an elaborate mixing procedure may be required to maintain suspension of the paclobutrazol particles. Further, settling or separation of the particles may cause uneven distribution of the composition upon a spray, soil injection, or other application. Due to such settling and/or separation of non-water soluble ingredients, a thickening agent may be beneficial in such compositions. A thickening agent may generally or substantially maintain suspension of one or more non-water soluble ingredients.

Gum-based thickening agents, such as cellulose gum or xanthan gum thickening agents for example, may be beneficial in some embodiments instead of, for example, clay-based or other powder-based thickening agents, because gum-based thickening agents may allow reduced drift and residue, while still providing minimal settling. That is, when the a composition of the present disclosure is applied through a spray application, use of a gum-based thickener in the composition may provide for a reduced amount of spray drift, as compared with the use of other thickening agents, such as clay-based thickening agents. In addition, a gum-based thickening agent may leave little to no visible residue behind on plant foliage or other surfaces. A gum-based thickener may provide for minimal particle settlement or separation within the composition, and may allow for a composition that does not have phytotoxic or other plant-harming properties.

Examples of suitable surfactants may include, but are not limited to, salts of alkyl sulfates, such as diethanolammonium lauryl sulfate; alkylarylsulfonate salts, such as calcium dodecylbenzenesulfonate; alkylphenol-alkylene oxide addition products, such as nonylphenol-C.sub.18 ethoxylate; alcohol-alkylene oxide addition products, such as tridecyl alcohol-C.sub.16 ethoxylate; soaps, such as sodium stearate; alkylnaphthalenesulfonate salts, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; and salts of mono and dialkyl phosphate esters. The surfactant may be cationic, anionic, non-ionic, or polymeric and may be employed as an emulsifying agent, wetting agent, suspending agent, and/or for other purposes. These or other surfactants may be used alone or in combination.

In some embodiments, a composition of the present disclosure may incorporate other active or inactive ingredients in place of or in addition to those listed above so long as the added ingredients do not materially change the basic and novel characteristics of the claimed invention. For example, other additives may include, but are not limited to, crystallization inhibitors, viscosity modifiers, spray droplet modifiers, pigments, antioxidants, foaming agents, anti-foaming agents, light-blocking agents, compatibility agents, sequestering agents, neutralizing agents and buffers, corrosion inhibitors, dyes, odorants, spreading agents, penetration aids, micronutrients, nutrients, emollients, lubricants, and sticking agents. Additionally or alternatively, in some embodiments, a composition of the present disclosure may have one or more agricultural products such as fertilizers, antibiotics, fruit elimination products, or insecticides.

While other active or inactive ingredients may be added to the composition, such active or inactive ingredients cannot materially change the basic and novel characteristics of the claimed composition. A plant growth regulating composition of the present disclosure slows the growth of a live plant but does not kill the plant. Herbicides, and more specifically broadleaf herbicides, are intended to kill plants to which they are applied, would materially change the basic and novel characteristics of the claimed composition, and are specifically excluded from plant growth regulating compositions as claimed and disclosed herein.

In some embodiments, one or more gibberellin inhibiting plant growth regulators or regulating agents may combined with one or more of hexanoic acid, a similar acid as described above, or a derivative, salt, or mixture thereof in a particular ratio. For example, in some embodiments, a composition or compositions of the present disclosure may have a ratio of between about 1:1000 up to about 2000:1 by weight of one or more plant growth regulating agents to one or more of hexanoic acid, a similar acid as described above, or a derivative, salt, or aqueous mixture thereof. Particularly, the ratio may range from about 1:500 to about 500:1 by weight in some embodiments. More particularly, the ratio may range from about 1:250 to about 250:1 by weight, from about 1:120 to about 120:1 by weight, or from about 1:60 to about 60:1 by weight. In some embodiments, the ratio may range from about 1:50 to about 50:1 by weight, from about 1:40 to about 40:1 by weight, from about 1:30 to about 30:1 by weight, from about 1:20 to about 20:1 by weight, or from about 1:10 to about 10:1 by weight. Even more particularly, in some embodiments, the ratio may range from about 1:9 to about 9:1 by weight, from about 1:8 to about 8:1 by weight, from about 1:7 to about 7:1 by weight, from about 1:6 to about 6:1 by weight, from about 1:5 to about 5:1 by weight, from about 1:4 to about 4:1 by weight, from about 1:3 to about 3:1 by weight, or from about 1:2 to about 2:1 by weight. In still further embodiments, the ratio may be approximately 1:1. For example, in some embodiments, a composition or compositions of the present disclosure may have a ratio of paclobutrazol to hexanoic acid of from about 1:10 to about 10:1 by weight. In other embodiments, any suitable ratio of gibberellin inhibiting plant growth regulator to hexanoic acid, a similar acid as described above, or derivative, salt, or mixture thereof may be used.

Similarly, in some embodiments, one or more anti-fungal agents may be combined with one or more of hexanoic acid, a similar acid as described above, or a derivative, salt, or mixture thereof in a particular ratio. For example, in some embodiments, a composition or compositions of the present disclosure may have a ratio of between about 1:1000 up to about 2000:1 by weight of one or more anti-fungal agents to one or more of hexanoic acid, a similar acid as described above, or a derivative, salt, or mixture thereof. Particularly, the ratio may range from about 1:500 to about 500:1 by weight in some embodiments. More particularly, the ratio may range from about 1:250 to about 250:1 by weigh, from about 1:120 to about 120:1 by weight, or from about 1:60 to about 60:1 by weight. In some embodiments, the ratio may range from about 1:50 to about 50:1 by weight, from about 1:40 to about 40:1 by weight, from about 1:30 to about 30:1 by weight, from about 1:20 to about 20:1 by weight, or from about 1:10 to about 10:1 by weight. Even more particularly, in some embodiments, the ratio may range from about 1:9 to about 9:1 by weight, from about 1:8 to about 8:1 by weight, from about 1:7 to about 7:1 by weight, from about 1:6 to about 6:1 by weight, from about 1:5 to about 5:1 by weight, from about 1:4 to about 4:1 by weight, from about 1:3 to about 3:1 by weight, or from about 1:2 to about 2:1 by weight. In still further embodiments, the ratio may be approximately 1:1. For example, in some embodiments, a composition or compositions of the present disclosure may have a ratio of azoxystrobin to hexanoic acid of from about 1:10 to about 10:1 by weight. In other embodiments, any suitable ratio of anti-fungal agent to hexanoic acid, a similar acid as described above, or derivative, salt, or mixture thereof may be used.

As the examples below show, it has been discovered that a short-chained monocarboxylic acid, such as hexanoic acid, or a derivative, salt, or aqueous or other mixture thereof may have an unexpected effect on the effectiveness of plant growth regulating agents. Generally, hexanoic acid, a similar acid as described above, or a derivative, salt, or aqueous or other mixture thereof, may operate to increase the effectiveness of one or more plant growth regulating agents when applied to a plant. That is, when a gibberellin inhibiting plant growth regulator is applied to a plant in combination with a short-chained monocarboxylic acid, such as hexanoic acid, or a derivative, salt, or mixture thereof, the plant may experience a faster response to the growth regulator, improved growth regulation, and/or other effects. Herbicides, and specifically broadleaf herbicides, are specifically excluded from compositions taught herein.

As the examples below additionally show, it has further been discovered that hexanoic acid, a similar acid as described above, or a derivative, salt, or aqueous or other mixture thereof may have an unexpected effect on the effectiveness of anti-fungal agents. Generally, hexanoic acid, a similar acid as described above, or a derivative, salt, or mixture thereof, may operate to increase the effectiveness of one or more fungicides when applied to a plant. That is, when an anti-fungal agent is applied to a plant in combination with hexanoic acid, a similar acid as described above, or a derivative, salt, or mixture thereof, the plant may experience decreased disease severity, decreased disease incidence, and/or other effects.

The a short-chained monocarboxylic acid, such as hexanoic acid, or a derivative, salt, or mixture thereof may be applied to a plant before, during, or after application of the one or more plant growth regulator and/or one or more anti-fungal agents. That is, for example, the components may be applied as a series of steps or stages in some embodiments, or may be applied simultaneously in a single composition in other embodiments. If administered sequentially, the components may be administered in any order in a suitable timescale. For example, up to a month, a week, 24 hours, or other suitable time period, may be permitted between application of the components. In some embodiments, it may be beneficial to allow no more than a few hours or 1 hour to pass between application of the components. If the components are administered simultaneously, it may be as a tank mix or as a pre-formulated mixture in some embodiments.

One or more compounds, including gibberellin inhibiting plant growth regulators and/or anti-fungal agents, and regulating agents, such as hexanoic acid, or derivatives, salts, or mixtures thereof, of the present disclosure may be used in an unmodified form or formulated into a composition using adjuvants, such as carriers, solvents, surface active substances, or others. A composition of the present disclosure may be in various physical forms, including but not limited to, dusting powders, gels, wettable powders, granules, water-dispersible granules, water dispersible tablets, effervescent tablets, emulsifiable concentrates, microemulsifiable concentrates, oil-in-water emulsions, suspensions, flowables, oil flowables, aqueous dispersions, oil dispersions, suspoemulsions, capsule suspensions, emulsifiable granules, soluble liquids, water soluble concentrates (with water or a water-miscible organic solvent as carrier) or impregnated polymer films. Such formulations may be used directly or diluted prior to use. Diluted formulations may be prepared for example, with water, liquid fertilizers, micronutrients, biological organisms, oil, or solvents. These formulations may contain as little as about 0.05% to as much as 95% or more by weight of active ingredients in some embodiments. The optimum amount for any given compound may depend on formulation, application equipment, environmental conditions, season, time of year, species, nature of the plant to be controlled, and/or other factors.

A composition of the present disclosure may be applied to a plant by various means. For example, in some embodiments, the composition may be applied directly as a soil treatment to one or more plants, or may be diluted with water or another diluent before a spray application. In other embodiments, the composition may be applied through a spray, drench, soil injection, trunk or stem injection, dusting, bark application, chemigation, soil incorporation, irrigation, plant dip, seed treatment, broadcast application, or other method of application. In some embodiments, multiple application methods may be used. For a spray application, any appropriate pump, spray nozzle, and/or other apparatus may be used. For a soil injection application, any appropriate pump, injection probe, and/or other apparatus may be used. Prior to application, the composition or diluted composition may be mixed or shaken.

Slowing the growth of a plant, without killing the plant, may provide various benefits. For example, use of the composition may lead to increased fine root density, which may further lead to increased drought tolerance. After application of a composition or compositions of the present disclosure, a plant may exhibit decreased water loss during a dry, hot period. In addition, the composition(s) may lead to leaves with higher concentrations of chlorophyll, which may show as thicker leaves with denser surface hairs and with a darker green color. Application of compositions of the present disclosure may also lead to fuller, as opposed to wider or longer, plant growth patterns, thus exhibiting a fuller and more compact plant. For the avoidance of doubt, killing the plant is not a desired outcome of slowing the growth of the plant.

Decreased plant growth, without killing the plant, may have external benefits as well. For example, less pruning or trimming of the plant may be required after application of a composition of the present disclosure. This may in turn lead to less labor and less waste material produced by the plant. A plant with slowed growth may also have reduced resource demand, reduced sensitivity to resource availability, and/or increased resource reserves. A plant after application may thus require less water, nutrients, and/or space. This may be especially beneficial where resources and/or land may be limited. Where one or more plants are located close to a building, power line, plumbing, or other structure, composition(s) of the present disclosure may be beneficial in minimizing damage to the structure as well as the one or more plants. Use of a composition or compositions of the present disclosure may lead to an increased root: shoot ratio, thus increasing the speed of root growth. In addition, plants with application of the composition(s) may also exhibit reduced sensitivity to stress or damage and overall increased durability. Application may therefore be beneficial as well where a potentially interfering building, power line, plumbing, or other structure is planned.

Example Compositions

In the following Example Applications, a hexanoic acid composition was combined with a gibberellin inhibiting plant growth regulator and/or a fungicide agent.

A plant growth regulating composition of the present disclosure may include, for example, paclobutrazol, flurprimidol, ethephon, and/or any other suitable gibberellin inhibiting plant growth regulator or regulating agent(s). The plant growth regulating agent(s) may be provided in the composition at any suitable concentration for slowing the growth of a live plant. For example, in some embodiments, the concentration of the one or more plant growth regulating agents may range from between less than 1 percent to approximately 99 percent. Particularly, in some embodiments, a plant growth regulating composition may have a concentration of one or more gibberellin inhibiting plant growth regulators or regulating agents ranging from about 0.2 percent to about 25 percent. In some embodiments, the plant growth regulating composition may be or may include one or more commercially available formulas. For example, in some embodiments, the plant growth regulating composition may be or include Trimtect™ 8% Paclobutrazol, supplied by Rainbow Treecare Scientific Advancements, Minnetonka, Minnesota. Additionally or alternatively, in some embodiments, the plant growth regulating composition may be or include Cambistat™ 22.3% Paclobutrazol, supplied by Rainbow Treecare Scientific Advancements, Minnetonka, Minnesota. In other embodiments, the plant growth regulating composition may include any other suitable concentration of one or more plant growth regulating agents. It may be appreciated that the concentration of one or more plant growth regulators may depend, at least in part, on formulation, application equipment, environmental conditions, season, time of year, species, nature of the plant to be controlled, and/or other factors in some embodiments. Additionally or alternatively, the plant growth regulating composition may be or include any other suitable ingredients, compositions, or components, such as but not limited to other active or inactive ingredients described above so long as such additional ingredients do not materially change the basic and novel characteristics of the invention-specifically, do not materially change the basic and novel characteristics of increasing the efficacy of a plant growth regulator to slow the growth of a live plant. Ingredients that kill the plant materially change the basic and novel characteristics of the invention. Accordingly, herbicides, and specifically broadleaf herbicides, are specifically excluded from compositions taught herein.

In some embodiments, a plant growth regulating composition of the present disclosure may be applied to a plant in an undiluted form, or may be diluted in, for example, water or any other suitable solvent(s) and/or other ingredients. For example, in some embodiments, a plant growth regulating composition may be applied to a plant at a rate of between less than 1 ppm and approximately 1,000,000 ppm (i.e., undiluted). More particularly, in some embodiments, a plant growth regulating composition may be applied to a plant at a rate of between about 0.2 ppm and about 75,000 ppm. In other embodiments, any other suitable application rate may be used. It may be appreciated that the application rate may depend, at least in part, on formulation, application equipment, environmental conditions, season, time of year, species, nature of the plant to be controlled, and/or other factors in some embodiments.

Additionally, a fungicide composition of the present disclosure may include, for example, azoxystrobin and/or any other suitable fungicide such as but not limited to those described above. The fungicide(s) may be provided in the composition at any suitable concentration. For example, in some embodiments, the concentration of the one or more fungicides may range from between less than 1 percent to approximately 99 percent. It may be appreciated that the concentration of one or more plant fungicides may depend, at least in part, on formulation, application equipment, environmental conditions, season, time of year, species, nature of the plant, and/or other factors in some embodiments. In some embodiments, the fungicide composition may be or include one or more commercially available formulas. For example, in some embodiments, the fungicide composition may be or include Heritage provided by Syngenta. Additionally or alternatively, the fungicide composition may be or include any other suitable ingredients, compositions, or components, such as but not limited to other active or inactive ingredients described above.

In some embodiments, a fungicide composition of the present disclosure may be applied to a plant in an undiluted form, or may be diluted in, for example, water or any other suitable solvent(s) and/or other ingredients. For example, in some embodiments, a fungicide composition may be applied to a plant at a rate of less than 1 fluid ounce per gallon and approximately 128 fluid ounces per gallon (i.e., undiluted). Particularly, in some embodiments, a fungicide composition may be applied to a plant at a rate of between approximately 1 fluid ounce per gallon and approximately 32 fluid ounces per gallon. More particularly, in some embodiments, a fungicide composition of the present disclosure may be applied to a plant at a rate of between approximately 1 fluid ounce per gallon and approximately 13 fluid ounces per gallon. In other embodiments, any other suitable application rate may be used. It may be appreciated that the application rate may depend, at least in part, on formulation, application equipment, environmental conditions, season, time of year, species, nature of the plant, and/or other factors in some embodiments.

As described above, in some embodiments, a short-chained monocarboxylic acid, such as hexanoic acid, or a derivative, salt, or mixture thereof may be applied to a plant in combination with one or more gibberellin inhibiting plant growth regulators and/or one or more fungicides. In some embodiments, the hexanoic acid may be provided in a hexanoic acid composition, which may be applied to a plant in combination with the plant growth regulating composition and/or fungicide composition. A hexanoic acid composition of the present disclosure may include between approximately 1% and approximately 100% by weight of hexanoic acid, or a derivative, salt, or aqueous or other mixture thereof. Particularly, a hexanoic acid composition of the present disclosure may include between approximately 10% and approximately 50% by weight of hexanoic acid or a derivative, salt, or mixture thereof in some embodiments. More particularly, a hexanoic acid composition of the present disclosure may have between approximately 15% and approximately 35% by weight of hexanoic acid or a derivative, salt, or mixture thereof in some embodiments. While hexanoic acid is discussed as a specific short-chained monocarboxyic acid for use with the disclosed compositions and methods, it is to be appreciated that any short-chained monocarboxylic acid having from five to eight carbon atoms, or a derivative, salt, or mixture thereof, may be used in some embodiments. Additionally, a hexanoic acid composition of the present disclosure may contain between approximately 1% and approximately 99% by weight of any suitable emulsifier. Particularly, a hexanoic acid composition of the present disclosure may contain between approximately 15% and approximately 75% by weight of any suitable emulsifier. More particularly, a hexanoic acid composition of the present disclosure may have between approximately 30% and approximately 45% by weight of any suitable emulsifier. Moreover, a hexanoic acid composition of the present disclosure may have between approximately 1% and approximately 99% by weight of glycerin, or any other suitable solvent or carrier liquid or combination of solvents or carrier liquids. Particularly, a hexanoic acid composition of the present disclosure may have between approximately 15% and approximately 75% by weight of a solvent or carrier liquid. More particularly, a hexanoic acid composition of the present disclosure may have between approximately 30% and 45% by weight of a solvent or carrier liquid. In some embodiments, a hexanoic acid composition of the present disclosure may additionally or alternatively include any other suitable ingredients, compositions, or components, such as but not limited to other active or inactive ingredients described above. The formulation for the hexanoic acid composition used in the Example Applications described herein is provided below. However, it is to be appreciated that a hexanoic acid composition of the present disclosure is not limited to the following composition.

TABLE 1

| Example Hexanoic Acid Composition | |
| --- | --- |
| Component | Percent by Weight (%) |
| 99% Hexanoic Acid | 25.0 |
| Akumul VO/2003 (emulsifier) | 37.5 |
| Glycerin | 37.5 |

In some embodiments, a hexanoic acid composition of the present disclosure may be applied to a plant in an undiluted form, or may be diluted in, for example, water or any other suitable solvent(s) and/or ingredients. For example, in some embodiments, a hexanoic acid composition may be applied to a plant at a rate of between less than 1 ppm and approximately 50,000 ppm. Particularly, in some embodiments, a hexanoic acid composition may be applied to a plant at a rate of between approximately 0.01 ppm and approximately 30,000 ppm. More particularly, in some embodiments, a hexanoic acid composition may be applied to a plant at a rate of between about 0.025 ppm and about 25,000 ppm. In other embodiments, any other suitable application rate may be used. It may be appreciated that the application rate may depend, at least in part, on formulation, application equipment, environmental conditions, season, time of year, species, nature of the plant, and/or other factors in some embodiments.

As demonstrated in the following Example Application, the Example Hexanoic Acid Composition of Table 1, plant growth regulating compositions, and fungicide compositions were applied to plants both individually and in combination with one another. Generally, improved growth regulation results were seen when a plant growth regulating composition was applied in combination with the hexanoic acid. Moreover, improved response to fungicide compositions was seen when a fungicide composition was applied in combination with the hexanoic acid.

Example Application 1 (Plant Growth Regulator)

The Example Hexanoic Acid Composition of Table 1 was added to a growth regulating composition. The compositions were diluted in water. Foliar spray treatments were applied on seven common landscape shrub species growing in a nursery field. Foliar spray applications of 6.4 fl. oz./gal. (4,000 ppm) of the growth regulating composition; 6.4 fl. oz./gal. (4,000 ppm) of growth regulating composition in combination with 12.1 ml./gal. (800 ppm) of the hexanoic acid composition; and 12.1 ml./gal. (800 ppm) of hexanoic acid composition were applied to three, 3-foot sections of hedge for each species on Jun. 26, 2015. A follow-up evaluation performed on Jul. 10, 2015, 14 days after treatment, yielded unexpected results. A second follow-up evaluation was performed on Jul. 20, 2015, 24 days after treatment. Note that all evaluations conducted in this trial and those that follow were done as blind evaluations. The relative growth regulation assessment of each species by treatment is given in Table 2 below.

TABLE 2

Apparent Growth Regulation in Plant Species

| | Evaluation Date | | | |
| --- | --- | --- | --- | --- |
| | Jul. 10, 2015 | | Jul. 20, 2015 | |
| Shrub Species | Plant Growth Regulator | Plant Growth Regulator + Hexanoic Acid | Plant Growth Regulator | Plant Growth Regulator + Hexanoic Acid |
| Potentilla 'Dakota Sunspot' | — | X | X | XX |
| Viburnum 'Emerald Triumph' | ○ | X | X | XX |
| Dwarf Pavement Rose | ○ | X | XX | XX |
| Wisteria 'Summer Cascade' | X | X | X | XX |
| Hydrangea 'Vanilla Strawberry' | — | X | X | X |
| Rhus aromatica | — | X | — | X |

— = No growth regulation apparent
○ = Slight growth regulation appearing on some replicates, inconsistent results
X = Growth regulation apparent (typified by darker green leaves, shorter internodes, compact appearance, slight leaf curling) on all replicates.
XX = Significant growth regulation (typified by reduced plant height relative to untreated plants, darker green leaves, shorter internodes, compact appearance).

Sections of hedges treated with growth regulating composition+hexanoic acid composition showed significant signs of growth regulation for all species within 14 days after treatment, ahead of growth regulating composition-only treatments. Furthermore, plants treated with the hexanoic acid composition in combination with the growth regulating composition generally showed a greater degree of growth control at the second evaluation on July 20 relative to growth regulating composition-only treatments. Sections of shrubs treated with growth regulating composition+ hexanoic acid composition were noted to be significantly shorter than untreated sections of shrubs, and those treated with only the growth regulating composition. This finding created the basis for future testing for the growth control potential of hexanoic acid in combination with Paclobutrazol.

Example Application 2 (Plant Growth Regulator)

A landscape trial was conducted on 3-foot long sections of *Viburnum odoratissimum* hedge. The species selected for the trial is fast-growing with an indeterminate growth characteristic common in the Florida landscape. Three sections of *Viburnum* hedge were randomly assigned to each treatment group. A plant growth regulating composition having approximately 8% paclobutrazol, such as Trimtect™ 8% Paclobutrazol, and the Example Hexanoic Acid Composition of Table 1 were diluted in water. Treatments included 6.4 fl. oz./gal. (4,000 ppm) of the growth regulating composition; 6.4 fl. oz./gal. (4,000 ppm) of the growth regulating composition in combination with 12.1 ml./gal. (800 ppm) of the hexanoic acid composition; and an untreated group. Treatments were applied as foliar sprays using a 4-gallon manual pump backpack sprayer fitted with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. A non-ionic surfactant, such as Audible™ 90 (Exacto Inc. Sharon, WI), was included in all spray solutions to improve foliar coverage. Applications were made on Jul. 27, 2015. Growth evaluations were performed on Sep. 29, 2015, and represent the consensus of two independent evaluators. Average growth ratings by treatment are reported in Table 3.

TABLE 3

| Average Growth Rating by Treatment | |
| --- | --- |
| Treatment | Average Growth Rating* (1-5) |
| Growth Regulating Composition (6.4 fl. oz./gal.) | 3.0 |
| Growth Regulating Composition (6.4 fl. oz./gal.) + Hexanoic Acid Composition (12.1 ml./gal.) | 2.0 |
| Untreated Control | 4.3 |

*Growth ratings are assigned on a 1-5 scale, with 1 representing minimal growth and compact appearance, and 5 representing prolific growth and an unkempt appearance requiring re-shearing.

The growth regulating composition applied at the 6.4 fl. oz./gal. rate reduced regrowth of sections of *Viburnum odoratissimum* hedge relative to the untreated control, but were still determined to require re-shearing at the time of evaluation. Sections of hedge treated with the growth regulating composition and the hexanoic acid composition exhibited less growth relative to the sections treated with only the growth regulating composition and did not require re-shearing at the time of evaluation. Treatment with the hexanoic acid composition in combination with the growth regulating composition exhibited a surprising degree of growth control compared to both the untreated control and growth regulating composition treatment alone.

Example Application 3 (Plant Growth Regulator)

A landscape trial was conducted on wall sections (approximately 6 feet×8 feet) of *Ficus repens* vines. The selected species is fast-growing with an indeterminate growth characteristic common in the Florida landscape. Two *Ficus*-covered walls were randomly assigned to each treatment group. A plant growth regulating composition having approximately 8% paclobutrazol, such as Trimtect™ 8% Paclobutrazol, and the Example Hexanoic Acid Composition of Table 1 were diluted in water. Treatments included 4.8 fl. oz./gal. (3,000 ppm) of the plant growth regulating composition; 4.8 fl. oz./gal. (3,000 ppm) of the plant growth regulating composition in combination with 12.1 ml./gal. (800 ppm) of the hexanoic acid composition; and an untreated group. Treatments were applied as foliar sprays using a 4-gallon manual pump backpack sprayer fitted with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. A non-ionic surfactant, such as Audible™ 90 (Exacto Inc. Sharon, WI), was included in all spray solutions to improve foliar coverage. Applications were made on Jul. 27, 2015. Growth evaluations were performed on Sep. 29, 2015, and represent the consensus of two independent evaluators.

TABLE 4

| Average Growth Rating by Treatment | |
| --- | --- |
| Treatment | Average Growth Rating* (1-5) |
| Growth Regulating Compostion(4.8 fl. oz./gal.) | 3.0 |
| Growth Regulating Composition (4.8 fl. oz./gal.) + Hexanoic Acid Composition (12.1 ml./gal.) | 2.0 |
| Untreated control | 4.0 |

*Growth ratings are assigned on a 1-5 scale, with 1 representing minimal growth and compact appearance, and 5 representing prolific growth and an unkempt appearance requiring re-shearing.

The growth regulating composition applied at the 4.8 fl. oz./gal. rate reduced regrowth of sections of *Ficus repens* hedge relative to the untreated control, but were still determined to require re-shearing at the time of evaluation. Sections of hedge treated with the growth regulating composition and the hexanoic acid composition exhibited less growth relative to the sections treated with only the growth regulating composition and did not require re-shearing at the time of evaluation. Treatment with the hexanoic acid composition in combination with growth regulating composition exhibited a surprising degree of growth control compared to both the untreated control and growth regulating composition treatment alone.

Example Application 4 (Plant Growth Regulator)

A greenhouse trial was conducted in partnership with Dr. Kimberly Moore of the University of Florida-Davie on four species of containerized plants representing common Florida landscape species: *Hamelia patens* (firebush), *Jasminum multiflorum* (downy jasmine), *Chrysobalanus icaco* (cocoplum), and *Schefflera arboricola* (*Schefflera*). Five plants of each species were randomly assigned to treatment groups. A plant growth regulating composition having approximately 8% paclobutrazol, such as Trimtect™ 8% Paclobutrazol, and the Example Hexanoic Acid Composition of Table 1 were diluted in water. Treatments included two rates of the growth regulating composition, 6.4 fl. oz./gal. (4,000 ppm) and 9.6 fl. oz./gal. (6,000 ppm); two rates of the hexanoic acid composition, 6 ml./gal. (400 ppm) and 24 ml./gal. (1,600 ppm); each hexanoic acid composition rate in combination with each growth regulating composition rate; and an untreated group receiving a water-only spray. Plants were sheared for uniformity, measured, and photographed prior to treatment. Treatments were applied as foliar sprays using a 4-gallon manual pump backpack sprayer fitted with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. A non-ionic surfactant, such as Audible™ 90 (Exacto Inc.

Sharon, WI), was included in all spray solutions to improve foliar coverage. The height and width of each plant was measured on Oct. 20, 2015 at the time of application (week 0) and at two, four, six, and eight weeks after treatment. The average change in plant size (height x width) over the first two weeks is reported in Tables 5-8 below as a percentage of initial plant size. Positive values represent an increase in plant size; negative values represent a decrease in plant size.

TABLE 5

Percent Change in Average *Chrysobalanus Icaco* Plant Size 2 Weeks After Treatment

| Treatment | Percent Increase in Plant Size (%)[a] |
|---|---|
| 6.4 fl. oz./gal. Growth Regulating Composition | 18.05b |
| 9.6 fl. oz./gal. Growth Regulating Composition | 13.85bc |
| 6 ml./gal. Hexanoic Acid Composition | 35.54a |
| 24 ml./gal. Hexanoic Acid Composition | 28.49b |
| 6.4 fl. oz./gal. Growth Regulating Composition + 6 ml./gal. Hexanoic Acid Composition | 19.46b |
| 6.4 fl. oz./gal. Growth Regulating Composition + 24 ml./gal. Hexanoic Acid Composition | 8.60c |
| 9.6 fl. oz./gal. Growth Regulating Composition + 6 ml./gal. Hexanoic Acid Composition | 21.22b |
| 9.6 fl. oz./gal. Growth Regulating Composition + 24 ml./gal. Hexanoic Acid Composition | 7.63c |
| Untreated | 40.68a |

[a]Plant size was calculated as height multiplied by width.
Means followed by the same letter do not significantly differ (Waller-Duncan method, P = 0.05).

TABLE 6

Percent Change in Average *Hamelia Patens* Plant Size 2 Weeks After Treatment

| Treatment | Percent increase in plant size (%)[a] |
|---|---|
| 6.4 fl. oz./gal. Growth Regulating Composition | 8.90abc |
| 6 ml./gal. Hexanoic Acid Composition | 18.33ab |
| 24 ml./gal. Hexanoic Acid Composition | 16.36ab |
| 6.4 oz./gal. Growth Regulating Composition + 6 ml./gal. Hexanoic Acid Composition | 3.16bcd |
| 6.4 oz./gal. Growth Regulating Composition + 24 ml./gal. Hexanoic Acid Composition | 0d |
| Untreated | 27.36a |

[a]Plant size was calculated as height multiplied by width.
Means followed by the same letter do not significantly differ (Waller-Duncan method, P = 0.05).

TABLE 7

Percent Change in Average *Jasminum Multiflorum* Plant Size 2 Weeks After Treatment

| Treatment | Percent increase in plant size (%)[a] |
|---|---|
| 6.4 oz./gal. Growth Regulating Composition | 16.61ab |
| 9.6 oz./gal. Growth Regulating Composition | 30.22a |
| 6 ml./gal. Hexanoic Acid Composition | 23.59a |
| 24 ml./gal. Hexanoic Acid Composition | 10.59ab |
| 6.4 oz./gal. Growth Regulating Composition + | 7.84b |

TABLE 7-continued

Percent Change in Average *Jasminum Multiflorum* Plant Size 2 Weeks After Treatment

| Treatment | Percent increase in plant size (%)[a] |
|---|---|
| 6 ml./gal. Hexanoic Acid Composition | |
| 6.4 oz./gal. Growth Regulating Composition + 24 ml./gal. Hexanoic Acid Composition | 0.43b |
| 9.6 oz./gal. Growth Regulating Composition + 6 ml./gal. Hexanoic Acid Composition | 12.48ab |
| 9.6 oz./gal. Growth Regulating Composition + 24 ml./gal. Hexanoic Acid Composition | 9.04b |
| Untreated | 15.87ab |

[a]Plant size was calculated as height multiplied by width. Means followed by the same letter do not significantly differ (Waller-Duncan method, P = 0.05).

TABLE 8

Percent Change in Average *Schefflera Arboricola* Plant Size 2 Weeks After Treatment

| Treatment | Percent increase in plant size (%)[a] |
|---|---|
| 9.6 oz./gal Growth Regulating Composition | 35.03bc |
| 6 ml./gal. Hexanoic Acid Composition | 24.98bc |
| 24 ml./gal. Hexanoic Acid Composition | 64.29a |
| 9.6 fl. oz./gal. Growth Regulating Composition + 6 ml/gal Hexanoic Acid Composition | 40.50c |
| 9.6 fl. oz./gal. Growth Regulating Composition + 24 ml./gal. Hexanoic Acid Composition | 10.55c |
| Untreated | 32.17bc |

[a]Plant size was calculated as height multiplied by width. Means followed by the same letter do not significantly differ (Waller-Duncan method, P = 0.05).

Plants treated with the hexanoic acid composition in addition to growth regulating composition had a smaller increase in average plant size relative to other treatment groups two weeks after treatment. *C. icaco* (cocoplum) and *H. patens* (firebush) plants treated with 6.4 fl. oz./gal. growth regulating composition rate+24 ml./gal. hexanoic acid composition averaged significantly less growth with an 8.6% and 0% increase in plant size from week 0 to 2 respectively, than those plants treated with a solution of only 6.4 fl. oz./gal. growth regulating composition, which averaged 18% and 8.9% increases in plant size, respectively. Similarly, *J. multiflorum* (Jasmine) plants treated with 9.6 fl. oz./gal. growth regulating composition+24 ml./gal. hexanoic acid composition averaged a 9% size increase, compared to plants treated with a solution of 9.6 fl. oz./gal. growth regulating composition, which averaged a 30% increase in size from week 0 to 2. This effect appears rate-dependent, with plants treated with growth regulating composition plus the 24 ml./gal. rate of hexanoic acid composition showing less growth than those treated at the 6 ml./gal. rate of the hexanoic acid composition in combination with the growth regulating composition. For example, Jasmine plants treated with 9.6 fl. oz./gal. growth regulating composition+6 ml./gal. hexanoic acid composition averaged a 12.5% size increase compared to 9% for plants treated with 9.6 fl. oz./gal. growth regulating composition+24 ml./gal. hexanoic acid composition.

While the lower percent change in plant sizes noted for plants treated with the growth regulating composition in combination with hexanoic acid composition was not statistically significant for all species and rates by the Waller-Duncan method of pairwise comparison (p=0.05), a general growth reduction trend was still evident for those plants treated with growth regulating composition in combination with the hexanoic acid composition, compared to plants treated only with a comparable rate of growth regulating composition, particularly when the 24 ml./gal. rate of hexanoic acid composition was applied. The hexanoic acid composition alone did not reduce plant growth.

Example Application 5 (Plant Growth Regulator)

A greenhouse trial was conducted with individual cocoplum (Chrysobalanus icaco) plants grown in 6-inch diameter containers to an initial height of approximately 20 inches. A plant growth regulating composition having approximately 8% paclobutrazol, such as Trimtect™ 8% Paclobutrazol, and the Example Hexanoic Acid Composition of Table 1 were diluted in water. Five plants were randomly assigned to each of six treatments. An untreated control group received a water spray. An adjuvant, such as Audible™ 90 (Exacto Inc. Sharon, WI), was included in all spray solutions to improve foliar coverage. The non-ionic surfactant was included at a concentration of approximately 0.05%. Prior to receiving treatment, plants were sheared for uniformity, measured, and photographed. Treatments were applied to the foliage using a manual pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. The height and width of each plant was measured at the time of treatment (week 0) and at four weeks after treatment. The results are presented in Tables 9 and 10.

TABLE 9

Change in *Chrysobalanus icaco* Plant Size 4 Weeks After Treatment

| Treatment | Plant Size[a] (Week 0) (cm2) | Plant Size[a] (Week 4) (cm2) | Percent Increase in Plant Size (%) |
|---|---|---|---|
| 6 ml./gal. Hexanoic Acid Composition | 316.1 | 567.1 | 79.4 |
| 24 ml./gal. Hexanoic Acid Composition | 298.8 | 491.2 | 63.7 |
| 9.6 oz./gal Growth Regulating Composition | 312.1 | 440.8 | 41.2 |
| 9.6 fl. oz./gal. Growth Regulating Composition + 6 ml/gal Hexanoic Acid Composition | 327.1 | 420.8 | 28.7 |
| 9.6 fl. oz./gal. Growth Regulating Composition + 24 ml./gal. Hexanoic Acid Composition | 319.6 | 378.5 | 18.4 |
| Untreated Control (water spray) | 354.8 | 658.8 | 85.7 |

[a]Plant size was calculated as height multiplied by width.

TABLE 10

Efficacy of the Hexanoic Acid Composition

| Treatment | Percent Growth Reduction Relative to Untreated Control (%) |
|---|---|
| 9.6 fl. oz./gal. Growth Regulating Composition + 6 ml/gal Hexanoic Acid Composition | 66.5 |

TABLE 10-continued

Efficacy of the Hexanoic Acid Composition

| Treatment | Percent Growth Reduction Relative to Untreated Control (%) |
|---|---|
| 9.6 fl. oz./gal. Growth Regulating Composition + 24 ml./gal. Hexanoic Acid Composition | 78.5 |

As shown in this Example, a growth regulating composition was applied to a first group of live plants at a rate of 9.6 oz/gal, while a second group of live plants received the same rate of growth regulating composition in combination with 6 ml/gal of a hexanoic acid composition, and a third group of live plants received the growth regulating composition in combination with 24 ml/gal of the hexanoic acid composition. Other groups of live plants received an application of the hexanoic acid composition alone, or received no treatment (i.e. untreated control).

As shown in Table 9, the plants treated with the growth regulating composition in combination with the hexanoic acid composition experienced a dramatic reduction in growth, as compared with the growth regulating composition alone. In particular, plants treated with 9.6 oz/gal of the growth regulating composition alone experienced an increase in plant size of 41.2% after 4 weeks. In stark contrast, plants treated 9.6 oz/gal of the growth regulating composition in combination with 6 ml/gal of the hexanoic acid composition experienced an increase in plant size of only 28.7%. This is a difference in plant growth of over 12%, which is significant, particularly when applied to large scale growing operations. Further, plants treated with 9.6 oz/gal of the growth regulating composition in combination with 24 ml/gal of the hexanoic acid composition experienced an increase in plant size of only 18.4%. This is a difference of over 20%. The marked improvements demonstrated by these applications would allow farmers, growers, or others to dramatically reduce plant growth, to apply significantly less growth regulator to achieve a desired growth, and/or may allow for fewer or less frequent applications of the growth regulator.

As the results show, the combined use of the plant growth regulator and the Example Hexanoic Acid Composition of Table 1 had a synergistic effect on growth reduction of containerized plants, persisting 4 weeks after treatment. The Example Hexanoic Acid Composition of Table 1 in combination with the growth regulator improved growth control significantly. Growth control was improved by 14.6% at the low rate tested and 26.6% at the high rate. This suggests that the effectiveness of the plant growth regulator is increased with an increased quantity of hexanoic acid.

Example Application 6 (Plant Growth Regulator)

Rows of Donald Wyman Lilac (*Syringa* X *prestoniae*) in a nursery bare-root growing field outside of Hastings, Minnesota measured approximately 22 inches tall at the time of treatment. Three five-foot row sections were randomly assigned to each of three treatments. Buffer strips were included between sections to prevent over-spray effects. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Prior to receiving treatment, plants were sheared for uniformity, measured, and photographed. Treatments were applied to the foliage using a manual pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. The height of each section was measured fourteen weeks after treatment. The results are presented in Tables 11 and 12.

TABLE 11

Mean Height of *Syringa X Prestoniae* at 14 Weeks After Treatment

| Treatment | Mean Height (in.) |
| --- | --- |
| 6.4 fl. oz./gal. Growth Regulating Composition | 36.3 |
| 6.4 fl. oz./gal. Growth Regulating Composition + 24 ml./gal. Hexanoic Acid Composition | 34.2 |
| Untreated Control | 39.7 |

TABLE 12

Efficacy of the Hexanoic Acid Composition

| Treatment | Percent Growth Reduction Relative to Untreated Control (%) |
| --- | --- |
| 6.4 fl. oz./gal. Growth Regulating Composition + 24 ml./gal. Hexanoic Acid Composition | 13.9 |

The results show that the combined use of the plant growth regulator with the Example Hexanoic Acid Composition of Table 1 had a synergistic effect on growth reduction of field-grown *Syringa* X *Prestoniae*.

Example Application 7 (Plant Growth Regulator)

A field site in Lompoc, CA was created involving: soil preparation, construction of an eight-foot deer exclosure fence and installation of a drip irrigation system. Thirty Glossy Abelia shrubs (*Abelia×grandiflora*) from 12-inch diameter pots were planted on a four-foot square grid in mulched beds approximately 17 months prior to trial initiation. Plants were sheared to uniformity using cube frames before both applications. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Treatments were applied to the foliage using a manual pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. A first treatment application was applied on Mar. 29, 2016, and a second treatment application was applied on Jun. 20, 2016. Plants were sheared back to their initial size at 12 and 22 weeks after initial treatment, and the clippings were collected, dried, and weighed to measure sheared biomass by species and treatment. The results are presented in Tables 13-15.

TABLE 13

Sheared Biomass of *Abelia X Grandiflora* After First and Second Applications

| Treatment | Mean Dry Biomass 12 Weeks After 1st Appl. (g) | Mean Dry Biomass 10 weeks after 2nd Appl. (g) |
| --- | --- | --- |
| 6.4 oz./gal Growth Regulating Composition | 253.9 | 87.2 |
| 6.4 fl. oz./gal. Growth Regulating Composition + 12.1 ml/gal Hexanoic Acid Composition | 230.9 | 67.2 |
| 6.4 fl. oz./gal. Growth Regulating Composition + 24.2 ml./gal. Hexanoic Acid Composition | 170.0 | 52.3 |
| Untreated Control | 383.4 | 145.0 |

TABLE 14

Sheared Biomass Reduction of *Abelia X Grandiflora* After First and SecondApplications Relative to Control Group

| Treatment | Percent Biomass Reduction 12 Weeks After 1st Appl. (%) | Percent Biomass Reduction 10 weeks after 2nd Appl. (%) |
| --- | --- | --- |
| 6.4 oz./gal Growth Regulating Composition | 33.8 | 39.9 |
| 6.4 fl. oz./gal. Growth Regulating Composition + 12.1 ml/gal Hexanoic Acid Composition | 39.8 | 53.7 |
| 6.4 fl. oz./gal. Growth Regulating Composition + 24.2 ml./gal. Hexanoic Acid Composition | 55.7 | 63.9 |

TABLE 15

Efficacy of the Hexanoic Acid Composition

| Treatment | Percent Total Reduction in Sheared Biomass after 22 Weeks (%) |
| --- | --- |
| 6.4 fl. oz./gal. Growth Regulating Composition + 12.1 ml/gal Hexanoic Acid Composition | 43.6 |
| 6.4 fl. oz./gal. Growth Regulating Composition + 24.2 ml./gal. Hexanoic Acid Composition | 57.9 |

The results show that the combined use of the plant growth regulator with the Example Hexanoic Acid Composition of Table 1 had a synergistic effect on growth reduction of field-grown *Abelia* X *Grandiflora*. The Example Hexanoic Acid Composition of Table 1 in combination with the growth regulator improved growth control significantly, as compared with the growth regulator alone. The results suggest that the effectiveness of the plant growth regulator is increased with an increased quantity of hexanoic acid

Example Application 8 (Plant Growth Regulator)

A field trial on growth regulation of *Aronia arbutifolia, Hibiscus syriacus* 'Minfren', *Ligustrum ovalifolium, Spiraea prunifolia, Viburnum dentatum* 'Chicago Lustre' and *Weigela florida* 'Alexandre' was conducted in nursery bare-root growing fields outside of Portland, Oregon. Three five-foot row sections were randomly assigned to each of six treatments. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Treatments were applied to the foliage using a manual pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. Buffer strips were included between sections to prevent over-spray effects. The height and depth of each section was measured at trial initiation and 13 weeks later. The results are presented in Tables 16-18.

TABLE 16

| Change in Plant Size 13 Weeks After Treatment | | | | | | |
|---|---|---|---|---|---|---|
| | Average Plant Size (in$^2$)$^a$ | | | | | |
| Treatment | Aronia | Hibiscus | Ligustrum | Spiraea | Viburnum | Weigela |
| 1.6 oz./gal Growth Regulating Composition | N/A | 406.7 | N/A | 632.7 | N/A | 850.0 |
| 3.2 oz./gal Growth Regulating Composition | 482.0 | 420.7 | 631.3 | 582.7 | 583.3 | 792.7 |
| 4.8 oz./gal Growth Regulating Composition | 423.7 | 372.0 | 539.0 | 513.0 | 552.0 | 704.0 |
| 6.4 fl. oz./gal. Growth Regulating Composition | 361.3 | N/A | 511.3 | N/A | 490.7 | N/A |
| 3.2 fl. oz./gal. Growth Regulating Composition + 6 ml./gal. Hexanoic Acid Composition | 395.7 | 386.3 | 537.3 | 468.7 | 483.3 | 664.3 |
| Untreated Control | 817.0 | 520.0 | 765.3 | 1043.0 | 756.7 | 1172.0 |

$^a$Plant size was calculated as height multiplied by width.

TABLE 17

| Growth Reduction Relative to Untreated Plants 13 Weeks After Treatment | | | | | | |
|---|---|---|---|---|---|---|
| | Percent Growth Reduction (%) | | | | | |
| Treatment | Aronia | Hibiscus | Ligustrum | Spiraea | Viburnum | Weigela |
| 1.6 oz./gal Growth Regulating Composition | N/A | 21.8 | N/A | 39.3 | N/A | 27.5 |
| 3.2 oz./gal Growth Regulating Composition | 41.0 | 19.1 | 17.5 | 44.1 | 22.9 | 32.4 |
| 4.8 oz./gal Growth Regulating Composition | 48.1 | 28.5 | 29.6 | 50.8 | 27.1 | 39.9 |
| 6.4 fl. oz./gal. Growth Regulating Composition | 55.8 | N/A | 33.2 | N/A | 35.1 | N/A |
| 3.2 fl. oz./gal. Growth Regulating Composition + 6 ml./gal. Hexanoic Acid Composition | 51.6 | 25.7 | 29.8 | 55.1 | 36.1 | 43.3 |

TABLE 18

| Efficacy of the Hexanoic Acid Composition | |
| --- | --- |
| Treatment | Percent Growth Reduction relative to Untreated Control after 13 Weeks (%) |
| 3.2 fl. oz./gal. Growth Regulating Composition + 6 ml./gal. Hexanoic Acid Composition | 25.7-55.1 |

The combined use of the plant growth regulator and the Example Hexonoic Acid Composition of Table 1 had a synergistic effect on growth reduction of a variety of field-grown shrub species. The growth control efficacy of the combined active ingredients ranged from 25.7% to 55.1%, depending on species. This efficacy range of the combined active ingredients represents a range of 6.6% to 13.2% improvement over the efficacy of the plant growth regulator alone across the tested species. Furthermore, the observed efficacy of the plant growth regulator combined with the Example Hexanoic Acid Composition of Table 1 was found to exceed the efficacy of the next highest rate tested, which could allow applicators to apply lower rates of the plant growth regulator to achieve a same or similar level of growth control.

Example Application 9 (Plant Growth Regulator)

Three five-foot by five-foot sections of a *Euonymus kiautchovicus* "Manhattan" hedge in Princeton, New Jersey were randomly assigned to each of five treatment groups, including an untreated control group. The hedge was lightly sheared to form prior to treatment. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Untreated buffers were included between treatment sections to prevent over-spray. Foliar applications were made with a motorized backpack sprayer and JD9-C spray gun (Green Garden), and calibrated to deliver 1 gallon of spray solution per 300 square feet of foliage. Growth evaluations were performed 80 days after treatment by counting the number of escapes (elongated shoots which detract from the hedge shape and appearance, requiring pruning). The results are shown in Tables 19-20.

TABLE 19

| Mean Escape Shoots of *Euonymus kiautchovicus* per Treatment Section | |
| --- | --- |
| Treatment | Mean Escapes |
| 9.6 fl. oz./gal. Growth Regulating Composition | 6.0 |
| 9.6 fl. oz./gal. Growth Regulating Composition + 18 ml./gal. Hexanoic Acid Composition | 7.0 |
| 9.6 fl. oz./gal. Growth Regulating Composition + 24 ml./gal. Hexanoic Acid Composition | 4.7 |

TABLE 19-continued

| Mean Escape Shoots of *Euonymus kiautchovicus* per Treatment Section | |
| --- | --- |
| Treatment | Mean Escapes |
| 9.6 fl. oz./gal. Growth Regulating Composition + 30 ml./gal. Hexanoic Acid Composition | 2.3 |
| Untreated Control | 15.3 |

TABLE 20

| Efficacy of the Hexanoic Acid Composition | |
| --- | --- |
| Treatment | Percent Growth Reduction Relative to Untreated Control (%) |
| 9.6 fl. oz./gal. Growth Regulating Composition + 18 ml./gal. Hexanoic Acid Composition | 54.2 |
| 9.6 fl. oz./gal. Growth Regulating Composition + 24 ml./gal. Hexanoic Acid Composition | 69.3 |
| 9.6 fl. oz./gal. Growth Regulating Composition + 30 ml./gal. Hexanoic Acid Composition | 85.0 |

As the results show, the combined use of the plant growth regulator and the Example Hexanoic Acid Composition of Table 1 had a synergistic effect on growth reduction of escape shoots on a well-maintained Manhattan *Euonymus* hedge. The observed efficacy of the combination treatment would significantly reduce hedge maintenance and improve the appearance of the hedge between maintenance intervals. The Example Hexanoic Acid Composition of Table 1 in combination with the growth regulator improved growth control significantly, as compared with the growth regulator alone. The results suggest that the effectiveness of the plant growth regulator is increased with an increased quantity of hexanoic acid

Example Application 10 (Plant Growth Regulator)

Four approximately equal sections of eight-foot tall of *Podocarpus* sp. hedges in Davie, Florida were randomly assigned to each of three treatment groups, including an untreated control group. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. *Podocarpus* hedges were sheared to form prior to treatment, and applications were sprayed to drip using a manual-pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. Blind evaluations were performed two months after treatment. The relative growth of each hedge section as evaluated on a 4-point scale, with 1 signifying minimal regrowth with a compact appearance, and 4 indicating prolific growth with an unkempt appearance. The results are presented in Tables 21-22.

TABLE 21

| Podocarpus Growth 2 Months after Foliar Spray Treatment | |
|---|---|
| Treatment | Mean Growth Rating (1-4 Scale) |
| 9.6 fl. oz./gal. Growth Regulating Composition | 2.25 |
| 9.6 fl. oz./gal. Growth Regulating Composition + 18 ml./gal. Hexanoic Acid Composition | 1.5 |
| Untreated Control | 3.25 |

TABLE 22

| Efficacy of the Hexanoic Acid Composition | |
|---|---|
| Treatment | Improvement on 4-Point Rating Scale Relative to Untreated Control |
| 9.6 fl. oz./gal. Growth Regulating Composition + 18 ml./gal. Hexanoic Acid Composition | 1.75 |

The appearance of *Podocarpus* hedges two months after treatment was significantly improved with the combination of the plant growth regulator and the Example Hexanoic Acid Composition of Table 1, compared to the efficacy of the plant growth regulator alone, indicating a synergy of the combined active ingredients.

Example Application 11 (Plant Growth Regulator)

Treatments were applied as foliar sprays to four individual plants or four-foot hedge sections of Chrysobalanus icaco (cocoplum) and *Coccoloba uvifera* (sea grape) growing in a landscape setting in Naples, Florida. A plant growth regulating composition having approximately 8% paclobutrazol, such as Trimtect™ 8% Paclobutrazol, and the Example Hexanoic Acid Composition of Table 1 were diluted in water. A non-ionic surfactant, such as Audible™ 90 (Exacto Inc. Sharon, WI), was included in all spray solutions to improve foliar coverage. The non-ionic surfactant was included at a concentration of approximately 0.05%. Plants were sheared to uniformity prior to treatment and sprayed to drip using a manual-pump backpack sprayer equipped with a TeeJet® 8006 nozzle (Spraying Systems Co. Wheaton, IL) calibrated to deliver approximately one gallon of solution per 300 sq. ft. of foliage. Plants were sheared back and treated a second time 11 weeks after the first application. To compare growth, plants were sheared back to their original dimensions ten weeks after the second application, and the clippings were amassed by treatment and photographed. The volume of each pile was estimated using ImageJ to calculate the area and height of each pile from photographs to estimate the volume of sheared plant material by treatment. (Rasband, W. S., ImageJ, U. S. National Institutes of Health, Bethesda, Maryland, USA, http://imagej.nih.gov/ij/, 1997-2016). The results are presented in Table 23.

TABLE 23

| Reduction in Sheared Plant Material Volume Relative to Untreated Control Group after 2 Treatments, 11 Weeks Apart | | |
|---|---|---|
| | Percent Reduction in Sheared Plant Volume (%) | |
| Treatment | Cocoplum | Sea Grape |
| 9.6 fl. oz./gal. Growth Regulating Composition | 60 | 48 |
| 9.6 fl. oz./gal. Growth Regulating Composition + 18 ml./gal. Hexanoic Acid Composition | 82 | 92 |
| 12.8 fl. oz./gal. Growth Regulating Composition | 81 | 95 |
| 12.8 fl. oz./gal. Growth Regulating Composition + 24 ml./gal. Hexanoic Acid Composition | 84 | 99 |

The combination of the lower rate of the plant growth regulator and the Example Hexanoic Acid Composition of Table 1 had an impact on growth control of nearly 33% more than the growth control rate of the plant growth regulator alone. The combination of the plant growth regulator at the higher rate with the Example Hexanoic Acid Composition of Table 1 virtually eliminated the need for shearing of treated plants after two treatment cycles.

Example Application 12 (Plant Growth Regulator)

Treatments were applied as foliar sprays to three individual plants or four-foot hedge sections of Hamelia patens (firebush) and *Plumbago* sp. (*Plumbago*) growing in a landscape setting in Naples, Florida. A plant growth regulating composition having approximately 8% paclobutrazol, such as Trimtect™ 8% Paclobutrazol, and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Plants were sheared to uniformity prior to treatment and sprayed to drip using a manual-pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sheared back and treated a second time 11 weeks after the first application. To compare growth, plants were sheared back to their original dimensions 11 and 21 weeks after the first application, and the clippings were amassed by treatment. The sheared material from each section of hedge was grouped by treatment and photographed. The volume of each pile was estimated using ImageJ to calculate the area and height of each pile from photographs to estimate the volume of sheared plant material by treatment. (Rasband, W. S., ImageJ, U. S. National Institutes of Health, Bethesda, Maryland, USA, http://imagej.nih.gov/ij/, 1997-2016). The results obtained are presented in Tables 24-26.

TABLE 24

Sheared Biomass Reduction of Firebush after First and Second
Applications Relative to Untreated Control Group

| Treatment | Percent Biomass Reduction 11 Weeks After 1$^{st}$ Appl. (%) | Percent Biomass Reduction 10 weeks after 2$^{nd}$ Appl. (%) |
|---|---|---|
| 9.6 oz./gal Growth Regulating Composition | 21 | 35 |
| 9.6 fl. oz./gal. Growth Regulating Composition + 18 ml/gal Hexanoic Acid Composition | 61 | 63 |

TABLE 25

Sheared Biomass Reduction of Plumbago after First and Second
Applications Relative to Control Group

| Treatment | Percent Biomass Reduction 11 Weeks After 1$^{st}$ Appl. (%) | Percent Biomass Reduction 10 weeks after 2$^{nd}$ Appl. (%) |
|---|---|---|
| 9.6 oz./gal Growth Regulating Composition | 58 | 72 |
| 9.6 fl. oz./gal. Growth Regulating Composition + 18 ml/gal Hexanoic Acid Composition | 66 | 91 |

TABLE 26

Efficacy of the Hexanoic Acid Composition

| Treatment | Percent Reduction in Sheared Biomass Relative to Untreated Control Group | |
|---|---|---|
| | Firebush | Plumbago |
| 9.6 fl. oz./gal. Growth Regulating Composition + 18 ml./gal. Hexanoic Acid Composition | 61-63 | 66-91 |

As shown in this Example, for some live plants, the addition of the hexanoic acid composition to the growth regulating composition led to a reduction in plant biomass of 61% after only one application, as compared with a reduction in biomass of only 21% after application of the growth regulating composition alone. That is, the addition of the hexanoic acid composition nearly tripled the reduction in biomass to these plants, as compared with application of the growth regulating composition alone. After a second application, reduction in biomass with the two components in combination was 63%, whereas reduction in biomass with the growth regulating composition alone was only 35%. That is, even after a second application, the hexanoic acid composition improved the effectiveness of the growth regulating composition so much that the reduction in biomass for those plants treated with both compositions was nearly double that of plants treated only with the growth regulating composition alone. These numbers are significant and truly unexpected.

As the results indicate, improved efficacy was observed with the combined active ingredients of the plant growth regulator and the Example Hexanoic Acid Composition of Table 1. The combination of the two ingredients virtually eliminated the need for shearing of treated plants after two treatment cycles, reducing the sheared biomass as much as 91% compared with the untreated control group.

Example Application 13 (Plant Growth Regulator)

Treatments were applied as soil injections to tree-form *Ligustrum japonicum* (Japanese privet) growing in an Orlando, Florida landscape on a three month re-application interval. A plant growth regulating composition having approximately 22.3% paclobutrazol, such as Cambistat™ 22.3% Paclobutrazol, and the Example Hexanoic Acid Composition of Table 1 were diluted in water. Treatment solutions were prepared with an adjuvant, such as Alypso (Precision Laboratories) at 0.8% concentration. Plants were sheared to uniformity prior to treatment, and soil applications were made with an HTI2000 soil injection probe (Rainbow Treecare Scientific Advancements) and a motorized backpack (Maruyama). Blind evaluations were performed 35 weeks after initial treatments, following two rounds of applications six months apart. The relative growth of each tree was evaluated on a 4-point scale, with 1 signifying minimal regrowth with a compact appearance, and 4 indicating prolific growth with an unkempt appearance. The results are presented in Table 27.

TABLE 27

*Ligustrum japonicum* Growth 35 Weeks after
Initial Shearing and Treatment

| Treatment | Mean Growth Rating (1-4 Scale) |
|---|---|
| 10.6 fl. oz./gal. Growth Regulating Composition | 1.4 |
| 21.3 fl. oz./gal. Growth Regulating Composition | 0.6 |
| 10.6 fl. oz./gal. Growth Regulating Composition + 0.8 fl. oz./gal. Hexanoic Acid Composition | 1.2 |
| Untreated Control | 2.4 |

As shown, the appearance of *Ligustrum* trees after three rounds of soil application treatment was improved with the combination of the plant growth regulator with the Example Hexanoic Acid Composition of Table 1, as compared with the plant growth regulator alone at a same application rate.

Example Application 14 (Plant Growth Regulator)

Treatments were applied as soil injections to mature *Ulmus pumila* (Siberian elm) trees regularly receiving maintenance pruning by a power utility company in Albuquerque, New Mexico. A plant growth regulating composition having approximately 22.3% paclobutrazol, such as Cambistat™ 22.3% Paclobutrazol, and the Example Hexanoic Acid Composition of Table 1 were diluted in water. Treatment solutions were prepared with an adjuvant, such as Alypso (Precision Laboratories) at 0.8% concentration. Plants were sheared to uniformity prior to treatment, and soil applications were made with an HTI2000 soil injection probe (Rainbow Treecare Scientific Advancements) and a motorized backpack (Maruyama). The dilute solution was applied at 75 ml solution per inch diameter (measured at 4.5 feet above soil grade), spaced uniformly around the tree within 18 inches of the base. Trees were pruned to line clearance specifications approximately two months after treatment. Blind evaluations were performed one year after treatment. Eight shoots re-growing from the utility prune cuts were sampled from each of four trees with a pole pruner and measured. The results are presented in Table 28.

TABLE 28

| Shoot Regrowth of Pruned Siberian Elm 1 Year after Treatment | |
| --- | --- |
| Treatment | Mean Shoot Growth (in) |
| 10.7 fl. oz./gal. Growth Regulating Composition | 63.9 |
| 10.7 fl. oz./gal. Growth Regulating Composition + 24 ml./gal. Hexanoic Acid Composition | 43.8 |

Ain accordance with this Example, 10.7 oz/gal of the growth regulating composition was applied to a first group of live trees alone, and 10.7 oz/gal of the growth regulating composition in combination with 24 ml/gal of the hexanoic acid composition was applied to a second group of live trees. Evaluations were performed one year after treatment. As shown in Table 28, the addition of the hexanoic acid composition reduced mean shoot growth of the trees by nearly one third. In particular, mean shoot growth for the trees treated with the growth regulating composition was 63.9 inches, while mean shoot growth for the trees treated with the growth regulating composition and the hexanoic acid composition was 43.8 inches. Once again, these numbers are significant and truly unexpected. This could lead to dramatic reductions in the time and expense needed to reduce plant growth and maintain and trim plants.

Control of shoot regrowth from pruned Siberian elm trees was improved by 31% with the combination of the plant growth regulator with the Example Hexanoic Acid composition of Table 1 over the plant growth regulator alone within a year after pruning. Conventionally, many species which flush regrowth rapidly following pruning can be difficult to control with soil-applied growth regulating treatments. Growth control with conventionally applied plant growth regulators is typically poorer in the first season following pruning than subsequent seasons, which limits total growth control achieved and can be problematic for maintaining line clearance for three or more years. The significant impact of the hexanoic acid used in combination with the plant growth regulator within one year of treatment suggests that the combination treatment provides faster growth control and a significant advantage over the plant growth regulator alone, and can provide a significant improvement over conventional plant growth regulator applications.

Example Application 15 (Plant Growth Regulator)

Rows of Glossy Black Aronia (*Aronia melanocarpa* 'Elata') and Wayfaringtree *Viburnum* (*Viburnum lantana* 'Mohican') were grown in a nursery bare-root growing field outside of Hastings, MN. Three five-foot row sections were randomly assigned to each of three treatments. Buffer strips were included between sections to prevent over-spray effects. A plant growth regulating composition having approximately 16% flurprimidol, such as Cutless MEC (SePRO Corporation, Carmel, Indiana), and the Example Hexanoic Acid Composition of Table 1 were diluted in water. An adjuvant, such as Audible™ 90 (Exacto Inc. Sharon, WI), was included in all spray solutions to improve foliar coverage. The non-ionic surfactant was included at a concentration of approximately 0.05%. Treatments were applied to the foliage using a manual pump backpack sprayer (Chapin) equipped with a TeeJet® 8006 nozzle (Spraying Systems Co. Wheaton, IL) calibrated to deliver approximately one gallon of solution per 300 sq. ft. of foliage. Plants were sprayed until solution began to drip from the leaves. The height of each section as measured 3.5, 10, and 18 weeks after treatment. The results are presented in Tables 29-31.

TABLE 29

| Glossy Black Aronia Mean Height after Treatment | | | |
| --- | --- | --- | --- |
| | | Mean Height (in) | |
| Treatment | 3.5 Weeks | 10 Weeks | 18 Weeks |
| 400 ppm Growth Regulating Composition | 15.7 | 17.2 | 18.0 |
| 400 ppm Growth Regulating Composition + 1585 ppm Hexanoic Acid Composition | 14.7 | 15.8 | 15.0 |
| Untreated Control | 19.8 | 25.7 | 30.0 |

TABLE 30

| Wayfaringtree Viburnum Mean Height after Treatment | | | |
| --- | --- | --- | --- |
| | | Mean Height (in) | |
| Treatment | 3.5 Weeks | 10 Weeks | 18 Weeks |
| 400 ppm Growth Regulating Composition | 21.8 | 19.8 | 30.3 |
| 400 ppm Growth Regulating Composition + 1585 ppm Hexanoic Acid Composition | 13.3 | 17.8 | 25.5 |
| Untreated Control | 16.8 | 27.0 | 37.7 |

TABLE 31

| Efficacy of the Hexanoic Acid Composition | | |
| --- | --- | --- |
| | Percent Reduction in Height Relative to Untreated Control (%) | |
| Treatment | Aronia | Viburnum |
| 400 ppm Growth Regulating Composition + 1585 ppm Hexanoic Acid Composition | 25.8-50.0 | 20.8-34.1 |

As the results show, the combined use of the plant growth regulator and the Example Hexanoic Acid Composition of Table 1 had a synergistic effect on growth reduction of field-grown *Aronia* and *Viburnum*, improving growth control on *Aronia* by 10%, and improving growth control on *Viburnum* by 19.6% over 18 weeks, as compared with the plant growth regulator treatment alone.

Example Application 16 (Plant Growth Regulator and Fungicide)

A study was conducted with Dr. Palmateer from the University of Florida in which *Viburnum* (*Viburnum odoratissimum* 'Awabuki') plants were submitted tone of twelve fungicide treatments, including untreated controls. Disease free *viburnum* plants were grown in 10-inch pots under full sun conditions. Plants were fertilized with a commercially available fertilizer, such as Suncote 15-8-11, and watered twice daily via overhead irrigation. Experimental units were a plant treated with a single fungicide treatment with 5 repetitions in a randomized complete block design (RCBD).

A plant growth regulating composition having approximately 8% paclobutrazol, such as Trimtect™ 8% Paclobutrazol, an azoxystrobin fungicide, such as Heritage, and the Example Hexanoic Acid Composition of Table 1 were diluted in water. Treatments included two rates of the growth regulating composition, 6.4 fl. oz./gal. (4,000 ppm) and 12.8 fl. oz./gal. (6,000 ppm); four rates of the hexanoic acid composition, 1.5 ml./gal. (100 ppm), 6 ml./gal. (400 ppm), 12 ml./gal. (800 ppm), and 24 ml./gal. (1,600 ppm); the fungicide composition applied at a rate of 0.6 g./gal.; the plant growth regulating composition in combination with the hexanoic acid composition at varying rates; the fungicide composition in combination with the hexanoic acid composition at varying rates; the plant growth regulating composition in combination with the fungicide composition at varying rates; and a control. Treatments were applied as foliar spray to drip, delivering 1 gallon of solution per 300-400 ft$^2$, and treated plants were not watered for 24 hours following application. Treatments were applied on Oct. 21, 2015 and Jan. 20, 2016.

A first treatment application was applied on Oct. 21, 2015. Downy mildew began appearing on some plants on Jan. 5, 2016. Plants were pruned to equal canopy size on Jan. 14, 2016, and a second treatment application was applied on Jan. 20, 2016. *Viburnum* plants infected with downy mildew were introduced on Jan. 22, 2016 and placed between treatment blocks and around the perimeter of the trial. Table 32 shows growth measurements of height and two perpendicular width measurements. Disease variables, including incidence (number of diseased leaves) and severity (average visual estimation of the percent of leaf area affected) were measured weekly from Oct. 22, 2015 through Feb. 24, 2016. Table 33 shows disease measurements obtained related to the second treatment application. Disease pressure was moderate from mid-January to February. All disease variables were submitted to analysis of variance (ANOVA) using SAS v. 9.4, and means were separated using Student Newman Keuls test.

TABLE 32

| Treatment No. | Rate | Height (inches) | Width 1 (inches) | Width 2 (inches) |
|---|---|---|---|---|
| | Height and Width of Viburnum plants recorded after first treatment application | | | |
| 1 | 6.4 oz./gal Growth Regulating Composition | 15 bcd$^z$ | 12c | 12d |
| 2 | 6 ml./gal. Hexanoic Acid Composition | 15cd | 15ab | 14bcd |
| 3 | 12 ml./gal. Hexanoic Acid Composition | 17a | 17a | 15ab |
| 4 | 24 ml./gal. Hexanoic Acid Composition | 16ab | 17a | 16a |
| 5 | 6.4 fl. oz./gal. Growth Regulating Composition + 6 ml/gal Hexanoic Acid Composition | 13ef | 16ab | 15ab |
| 6 | 6.4 fl. oz./gal. Growth Regulating Composition + 12 ml./gal. Hexanoic Acid Composition | 12f | 14bc | 12d |
| 7 | 6.4 fl. oz./gal. Growth Regulating Composition + 24 ml./gal. Hexanoic Acid Composition | 12f | 13c | 12cd |
| 8 | 12.8 oz./gal. Growth Regulating Composition | 15abcd | 15ab | 15ab |
| 9 | 0.6 g./gal. Fungicide Composition | 16ab | 16ab | 15ab |
| 10 | 0.6 g./gal. Fungicide Composition + 6 ml./gal. Hexanoic Acid Composition | 15bcd | 16ab | 14abc |
| 11 | 0.6 g./gal. Fungicide Composition + 12 ml./gal. Hexanoic Acid Composition | 14de | 13c | 12d |

TABLE 32-continued

| Treatment No. | Rate | Height (inches) | Width 1 (inches) | Width 2 (inches) |
|---|---|---|---|---|
| | Height and Width of Viburnum plants recorded after first treatment application | | | |
| 12 | 0.6 g./gal. Fungicide Composition + 24 ml./gal. Hexanoic Acid Composition | 14de | 12c | 12d |
| 13 | Untreated | 16abc | 15ab | 14bcd |

$^z$Column means indicated with the same letters are not significantly different (P ≤ 0.05) based on Student Newman Keuls test.

Plants treated with the hexanoic acid composition (12 ml./gal.) were tallest and measurements for height were statistically greater than those plants treated with the plant growth regulating composition, the plant growth regulating composition in combination with the hexanoic acid composition, and the fungicide composition in combination with the hexanoic acid composition. Plants treated with the plant growth regulating composition in combination with the hexanoic acid composition (24 ml./gal.) were shortest and values differed statistically from all other treatments except for plants that were treated with the growth regulating composition in combination with the hexanoic acid composition at rates of 6 ml./gal. and 12 ml./gal.

TABLE 33

| Treatment No. | Rate | Incidence$^y$ | Severity$^z$ |
|---|---|---|---|
| | Disease levels of Viburnum plants recorded after second treatment application | | |
| 1 | 6.4 oz./gal Growth Regulating Composition | 9.4a$^x$ | 37a |
| 2 | 1 oz./gal Growth Regulating Composition | 7.8ab | 35a |
| 3 | 1.5 ml./gal. Hexanoic Acid Composition | 2.8cd | 14c |
| 4 | 12 ml./gal. Hexanoic Acid Composition | 3.4bc | 15bc |
| 5 | 6.4 fl. oz./gal. Growth Regulating Composition + 1.5 ml/gal Hexanoic Acid Composition | 6.4abc | 29abc |
| 6 | 6.4 fl. oz./gal. Growth Regulating Composition + 12 ml./gal. Hexanoic Acid Composition | 4bc | 20abc |
| 7 | 12.8 oz./gal. Growth Regulating Composition | 3.6bc | 16bc |
| 8 | 0.6 g./gal. Fungicide Composition | 6.6abc | 30abc |
| 9 | 0.6 g./gal. Fungicide Composition + 1.5 ml./gal. Hexanoic Acid Composition | 0.8d | 4d |
| 10 | 0.6 g./gal. Fungicide Composition + 12 ml./gal. Hexanoic Acid Composition | 5.4abc | 29abc |
| 11 | 0.6 g./gal. Fungicide Composition + 1 oz./gal Growth Regulating Composition | 2.6cd | 13c |
| 12 | 0.6 g./gal. Fungicide Composition + 6.4 oz./gal Growth Regulating Composition | 3.4bc | 18abc |
| 13 | Untreated | 5abc | 28abc |

$^x$Column means indicated with the same letters are not significantly different (P ≤ 0.05) based on Student Newman Keuls test.
$^y$Incidence (the # of leaves showing sporulation) values are from rating recorded weekly.
$^z$Severity (percent of plant canopy exhibiting disease) values are from ratings recorded weekly.

Total leaf number for plants treated with the hexanoic acid composition (600 ppm), the plant growth regulator composition in combination with the hexanoic acid (24 ml./gal.), and the fungicide composition in combination with the hexanoic acid composition (12 ml./gal.) was statistically higher than pants treated with the hexanoic acid composition (800 ppm). As shown in Table 33, plants treated with the fungicide composition in combination with the hexanoic acid (1.5 ml./gal.) on the second application had the least amount of downy mildew and disease severity was statistically lower than all other treatments. There were no statistical differences for plant quality among treatments and no phytotoxicity was observed for any one treatment.

As shown by the above Example Applications, the application of a short-chain monocarboxylic acid, such as hexanoic acid, or a salt or amine thereof, to a plant in combination with a plant growth regulating agent may increase the effectiveness of the plant growth regulating agent. For example, the plant may respond to the regulator more quickly and may experience further reduced growth. This may be particularly beneficial for plants that have been pruned, for example. When plants are pruned, they may generally respond with a burst of growth. Growth regulators may be used to limit this post-pruning growth burst, but due to a delayed response, some initial growth may typically still occur. Plant growth regulating compositions of the present disclosure having an acid such as hexanoic acid or a salt or amine thereof may result in a quicker response, limiting this initial growth burst, and extending the time a tree or shrub can go without further pruning. Additionally, when such an acid or salt or amine thereof is applied in combination with a plant growth regulator, overall growth control may be as good as, or better than, that achieved using existing plant growth regulating products. As shown in the above examples, even a single treatment of a plant growth regulating composition with a hexanoic acid composition may increase the continued effectiveness of the growth regulation for weeks, months, or years after the treatment. In some cases, this may allow for lower concentrations or application rates of the plant growth regulator, which may lead to reduced cost of application and may limit the amount of chemicals in the environment, for example. Moreover, the plant may experience other benefits, such as increased resistance to various stresses, or other enhancements. As may additionally be seen from the above Example Applications, the improved growth regulation provided by the combination of the growth regulator and the hexanoic acid was experienced by a wide variety of plant types in a variety of climates and growing environments.

As further shown in the above Example Applications, the application of a short-chain monocarboxylic acid, such as hexanoic acid, or a salt or amine thereof, to a plant in combination with an anti-fungal agent may increase the effectiveness of the anti-fungal agent. For example, the plant may respond to the fungicide more quickly and may experience increased defense against fungal disease. This may be beneficial in reducing an amount of fungicide needed in treating plants. That is, when such an acid or salt or amine thereof is applied in combination with a fungicide, overall effectiveness may be as good as, or better than, that achieved using existing fungicide products. In some cases, this may allow for lower concentrations or application rates of the fungicide, which may lead to reduced cost of application and may limit the amount of chemicals in the environment, for example. Moreover, the plant may experience other benefits, such as increased resistance to various stresses, or other enhancements.

It may be appreciated that a composition of the present disclosure may be applied to generally any plant type, including but not limited to, trees, shrubs, bedding plants, vines, greenhouse crops, turfgrass, field crops, or orchard crops. Treatment of plants using one or more compositions of the present disclosure is not limited to those particular plants described above with respect to the Example Applications. Moreover, the improved growth regulation and other benefits shown and described above with respect to the Example Applications are expected across generally any plant type.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of an ingredient or element may still actually contain such item as long as there is generally no measurable effect thereof.

As used herein, the terms "about" and "approximately" should generally be understood to refer to both the corresponding number and a range of numbers. In addition, all numerical ranges herein should be understood to include each whole and fractional number within the range.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for regulating growth of a tree or shrub, the method comprising: applying to the tree or shrub a composition consisting essentially of:
   a first component comprising a gibberellin inhibiting plant growth regulating agent;
   a second component comprising at least one of a short-chained monocarboxylic acid having from five to eight carbon atoms, a derivative thereof, a salt thereof, and a mixture thereof;
   wherein a ratio of the gibberellin inhibiting plant growth regulating agent to the short-chained monocarboxylic acid is from about 5:1 to about 500:1 by weight; and
   wherein application of the composition slows growth of the tree or shrub without killing the tree or shrub.

2. The method of claim 1, wherein the short-chained monocarboxylic acid is hexanoic acid.

3. The method of claim 1, wherein the gibberellin inhibiting plant growth regulating agent is selected from the group consisting of trinexapac-ethyl, prohexadione-calcium, paclobutrazol, dikegulac-sodium, uniconazole, flurprimidol, mepiquat-chloride, chlormequat-chloride, butralin, daminozide, ethephon, maleic hydrazide, and a mixture thereof.

4. The method of claim 1, wherein the gibberellin inhibiting plant growth regulating agent comprises at least one of paclobutrazol and flurprimidol.

5. The method of claim 1, wherein the composition is applied to at least one of the plant roots, stems, trunk, branches, and foliage.

6. The method of claim 5, wherein the composition is applied using at least one of: irrigation, a drench application, a spray application, a chemigation, a soil injection application, a trunk injection application, root injection, and a stem injection application.

7. The method of claim 1, wherein the composition is applied as a mixture.

8. The method of claim 1, wherein the composition is applied by foliar application.

9. The method of claim 1, wherein the gibberellin inhibiting plant growth regulating agent is an azole, and wherein the gibberellin inhibiting plant growth regulating agent is not a quaternary ammonium compound.

10. The method of claim 1, wherein a ratio of the gibberellin inhibiting plant growth regulating agent to the short-chained monocarboxylic acid is from about 10:1 to about 500:1 by weight.

11. The method of claim 1, wherein a ratio of the gibberellin inhibiting plant growth regulating agent to the short-chained monocarboxylic acid is from about 20:1 to about 500:1 by weight.

12. A composition for regulating growth of a tree or shrub without killing the tree or shrub the composition consisting essentially of:

an effective amount of a gibberellin inhibiting plant growth regulating agent for regulating the growth of the tree or shrub wherein the tree or shrub growth regulating agent slows growth of the tree or shrub; and at least one of a short-chained monocarboxylic acid having from five to eight carbon atoms, a derivative thereof, a salt thereof, and a mixture thereof;

wherein a ratio of the gibberellin inhibiting plant growth regulating agent to the short-chained monocarboxylic acid is from about 5:1 to about 500:1 by weight.

13. The composition of claim 12, wherein the gibberellin inhibiting plant growth regulating agent comprises at least one of paclobutrazol and flurprimidol.

14. The composition of claim 12, wherein the gibberellin inhibiting plant growth regulating agent comprises paclobutrazol and ethephon.

15. The composition of claim 12, wherein the short-chained monocarboxylic acid is hexanoic acid.

16. The composition of claim 12, further comprising an adjuvant.

17. The composition of claim 12, wherein the short-chained monocarboxylic acid is provided in an acid composition comprising the short-chained monocarboxylic acid having from five to eight carbon atoms, a derivative thereof, a salt thereof, or a mixture thereof; and between approximately 30% and approximately 75% by weight of at least one emulsifier.

18. The composition of claim 12, wherein the gibberellin inhibiting plant growth regulating agent is an azole, and wherein the gibberellin inhibiting plant growth regulating agent is not a quaternary ammonium compound.

19. The composition of claim 12, wherein a ratio of the gibberellin inhibiting plant growth regulating agent to the short-chained monocarboxylic acid is from about 10:1 to about 500:1 by weight.

20. The composition of claim 12, wherein a ratio of the gibberellin inhibiting plant growth regulating agent to the short-chained monocarboxylic acid is from about 20:1 to about 500:1 by weight.

* * * * *